US011999176B2

(12) United States Patent
Yanokura

(10) Patent No.: US 11,999,176 B2
(45) Date of Patent: Jun. 4, 2024

(54) IMAGE FORMING APPARATUS

(71) Applicant: CANON KABUSHIKI KAISHA, Tokyo (JP)

(72) Inventor: Naoki Yanokura, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 17/900,932

(22) Filed: Sep. 1, 2022

(65) Prior Publication Data

US 2023/0141022 A1 May 11, 2023

(30) Foreign Application Priority Data

Nov. 10, 2021 (JP) ................................ 2021-183021

(51) Int. Cl.
*B41J 29/02* (2006.01)
*B41J 29/13* (2006.01)

(52) U.S. Cl.
CPC ............... *B41J 29/02* (2013.01); *B41J 29/13* (2013.01)

(58) Field of Classification Search
CPC .................................. B41J 29/02; B41J 29/13
See application file for complete search history.

(56) References Cited

U.S. PATENT DOCUMENTS

2020/0230986 A1* 7/2020 Hirata .................. B41J 2/17553

FOREIGN PATENT DOCUMENTS

JP 2020116808 A 8/2020

* cited by examiner

*Primary Examiner* — Bradley W Thies

(74) *Attorney, Agent, or Firm* — ROSSI, KIMMS & McDOWELL LLP

(57) ABSTRACT

In image forming apparatus including: a frame; a front cover that is fixed to a front surface of the frame; and an upper cover includes a plurality of engaging portions that is engaged with the front cover fixed to a front surface of the frame, the front cover includes a front-back regulating portion that is engaged with a first engaging portion included in the upper cover and regulates a position of the upper cover in the front-back direction, an up-down regulating portion that is engaged with a second engaging portion included in the upper cover and regulates a position of the upper cover in the up-down direction, and a right-left regulating portion that is engaged with a third engaging portion included in the upper cover and regulates a position of the upper cover in the right-left direction.

16 Claims, 18 Drawing Sheets

7
6
BACK
RIGHT
LEFT
FRONT
UP
DOWN
6f2
(6f)
7f2
(7f)
6f1
(6f)
7f1
(7f)
6g1
(6g)
7g2
(7g)
6g2
(6g)
7g1
(7g)
7h2
(7h)
6h1
(6h)
6h2
(6h)
7h1
(7h)
7i2
(7i)
6i1
(6i)
6i2
(6i)
7i1
(7i)
6j2
(6j)
7j2
(7j)
6j1
(6j)
7j1
(7j)

UP
DOWN
FRONT
BACK
RIGHT
LEFT
5
7
5k1 (5k)
7k1 (7k)
5k2 (5k)
7k2 (7k)
5l2 (5l)
7l2 (7l)
7l1 (7l)
5l1 (5l)
7m2 (7m)
5m2 (5m)
5m1 (5m)
7m1 (7m)
5n1 (5n)
7n1 (7n)
5n2 (5n)
7n2 (7n)
7p2 (7p)
5p1 (5p)
5p2 (5p)
7p1 (7p)

IMAGE FORMING APPARATUS

BACKGROUND OF THE INVENTION

Field of the Invention

The present invention relates to an image forming apparatus such as a printer, a copying machine, a facsimile, and a multifunction peripheral having these functions.

Description of the Related Art

Conventionally, an image forming apparatus in which a cover is attached to an apparatus main body is known. Japanese Patent Application Laid-Open No. 2020-116808 describes an image forming apparatus in which a box-shaped cover is attached to an apparatus main body.

An image forming apparatus described in Japanese Patent Application Laid-Open No. 2020-116808 includes a first positioning member that positions a cover at a first target position in a first direction with respect to an apparatus main body, and a second positioning member that positions the cover at a second target position in a second direction orthogonal to the first direction with respect to the apparatus main body.

In Japanese Patent Application Laid-Open No. 2020-116808, the cover attached to the apparatus main body is a box-shaped component, but generally, the device main body is often about a rectangular parallelepiped, and as the apparatus main body becomes larger, one cover is attached to one side surface of the apparatus main body.

In the configuration in which one cover is attached to one side surface of the apparatus main body, when it is not suitable to directly position the cover of a certain side surface with respect to the apparatus main body, it is necessary to position and fix the covers with each other. Specifically, the upper cover attached to the upper surface of the apparatus main body is positioned at the target position in the first direction by the front cover attached to the front surface of the apparatus body. Further, the upper cover is positioned at a target position in a second direction orthogonal to the first direction by a left cover attached to a left side surface of the apparatus main body.

In this way, when one cover is positioned by a plurality of covers, the accuracy of alignment between the covers is reduced due to the part tolerance between the upper cover and the front cover and the part tolerance between the upper cover and the left cover, and the aesthetic appearance of the appearance may be impaired.

SUMMARY OF THE INVENTION

A representative configuration of the present invention is an image forming apparatus including: a frame; a front cover that is fixed to a front surface of the frame; and an upper cover that is disposed on an upper surface of the frame and includes a plurality of engaging portions that is engaged with the front cover fixed to a front surface of the frame, when a side on which the front cover is fixed is defined as a front side and an opposite side is defined as a back side, when the image forming apparatus is viewed from the front side, one side in a width direction orthogonal to a front-back direction is defined as a right side and the other side is defined as a left side, and when an upward direction in a vertical direction orthogonal to the front-back direction and a right-left direction is defined as an upper side and a downward direction is defined as a lower side, the front cover including: a front-back regulating portion that is engaged with a first engaging portion included in the upper cover and abuts on a front side and a back side of the first engaging portion in the front-back direction to regulate a position of the upper cover in the front-back direction, an up-down regulating portion that is engaged with a second engaging portion included in the upper cover and abuts on an upper side and a lower side of the second engaging portion in an up-down direction to regulate a position of the upper cover in the up-down direction, and a right-left regulating portion that is engaged with a third engaging portion included in the upper cover and abuts on a left side and a right side of the third engaging portion in the right-left direction to regulate a position of the upper cover in the right-left direction, in which the first engaging portion, the second engaging portion, and the third engaging portion included in the upper cover are respectively engaged with the front-back regulating portion, the up-down regulating portion, and the right-left regulating portion of the front cover fixed to the front side of the frame to regulate the position of the upper cover in the front-back direction, the up-down direction, and the right-left direction.

Further features of the present invention will become apparent from the following description of exemplary embodiments with reference to the attached drawings.

DESCRIPTION OF THE EMBODIMENTS

Hereinafter, exemplary embodiments of the present invention will be exemplarily described with reference to the drawings in detail. However, the dimensions, materials, shapes, relative arrangements, and the like of the components described in the following embodiments should be appropriately changed depending on the configuration of the apparatus to which the present invention is applied and various conditions, and the scope of the present invention is not intended to be limited to them.

First Embodiment

Figure 1:
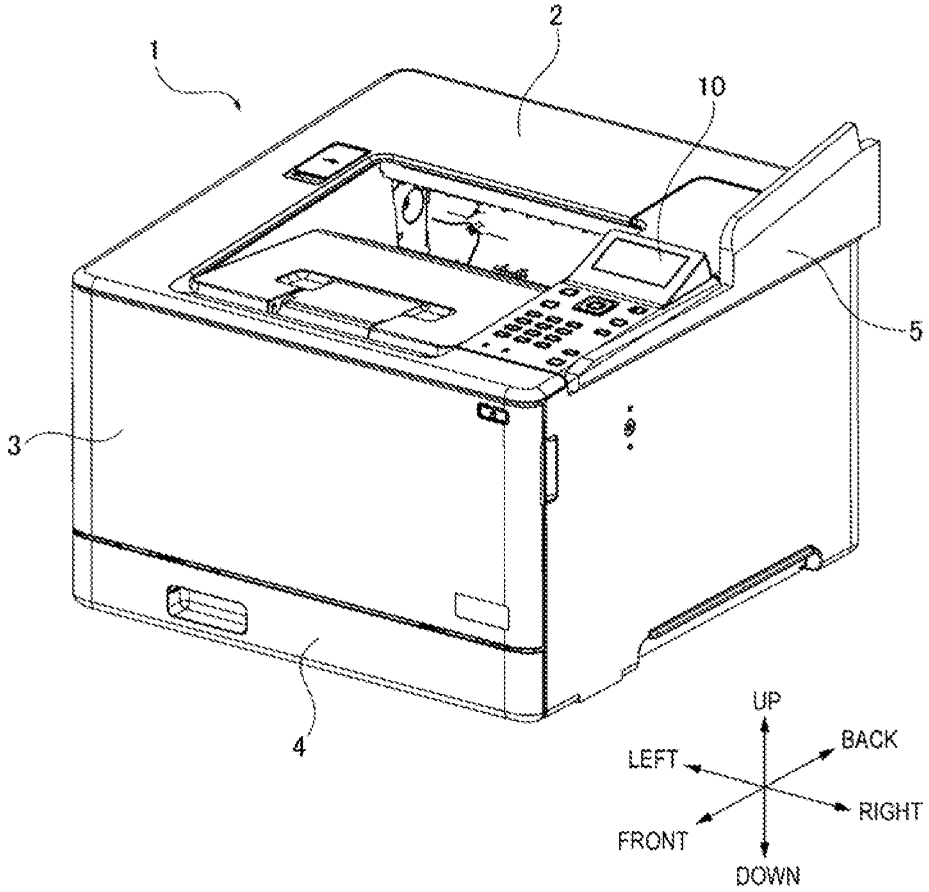
FIG. 1 is a perspective view of an image forming apparatus of a first embodiment.
Figure 2:
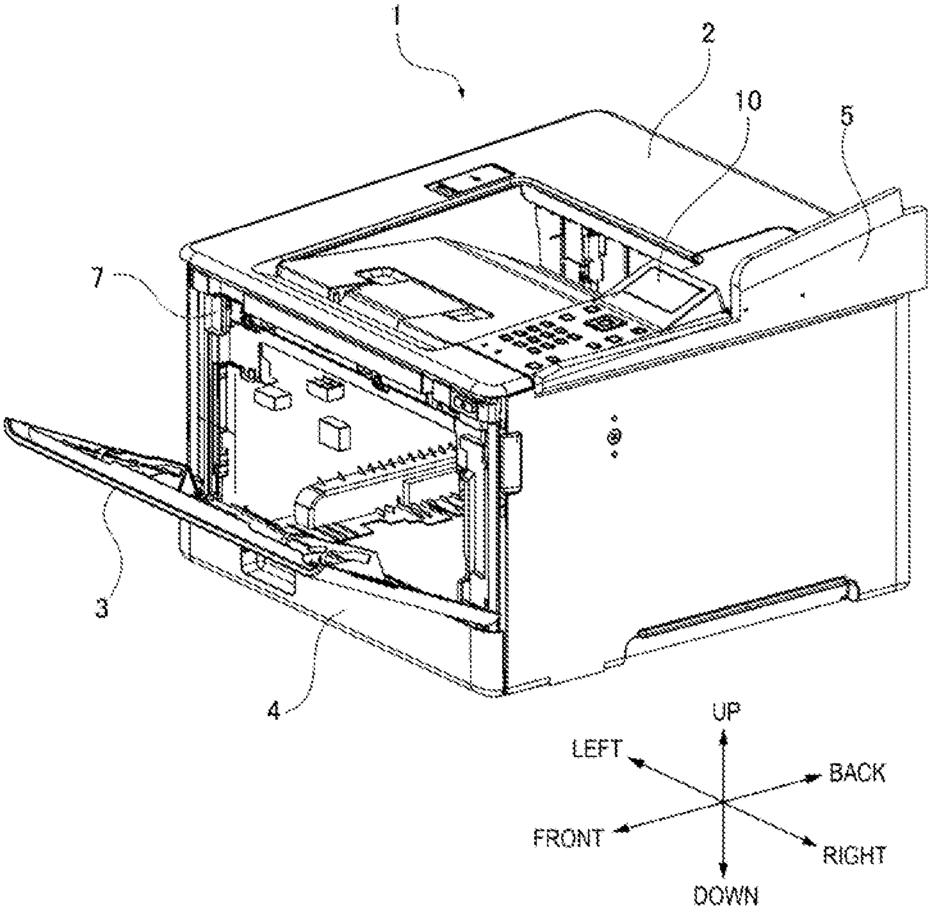
FIG. 2 is a perspective view of the image forming apparatus of the first embodiment.
Figure 3:
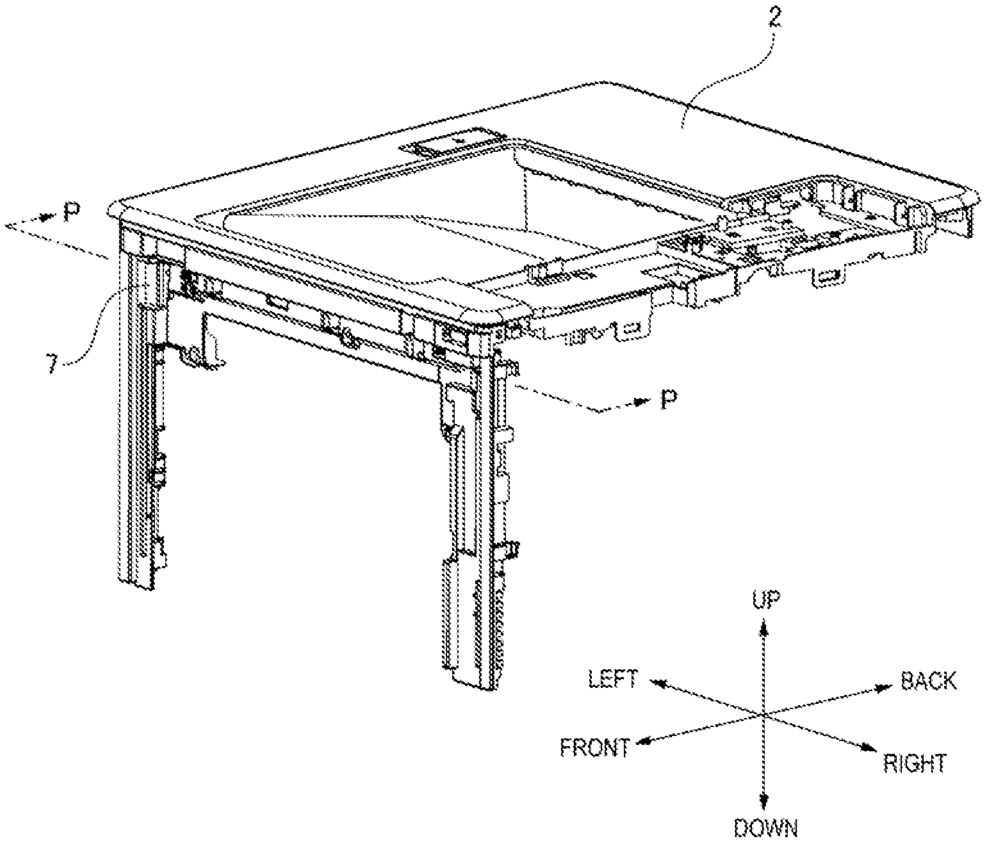
FIG. 3 is a perspective view of an upper cover and a front cover of the first embodiment.
Figure 4:
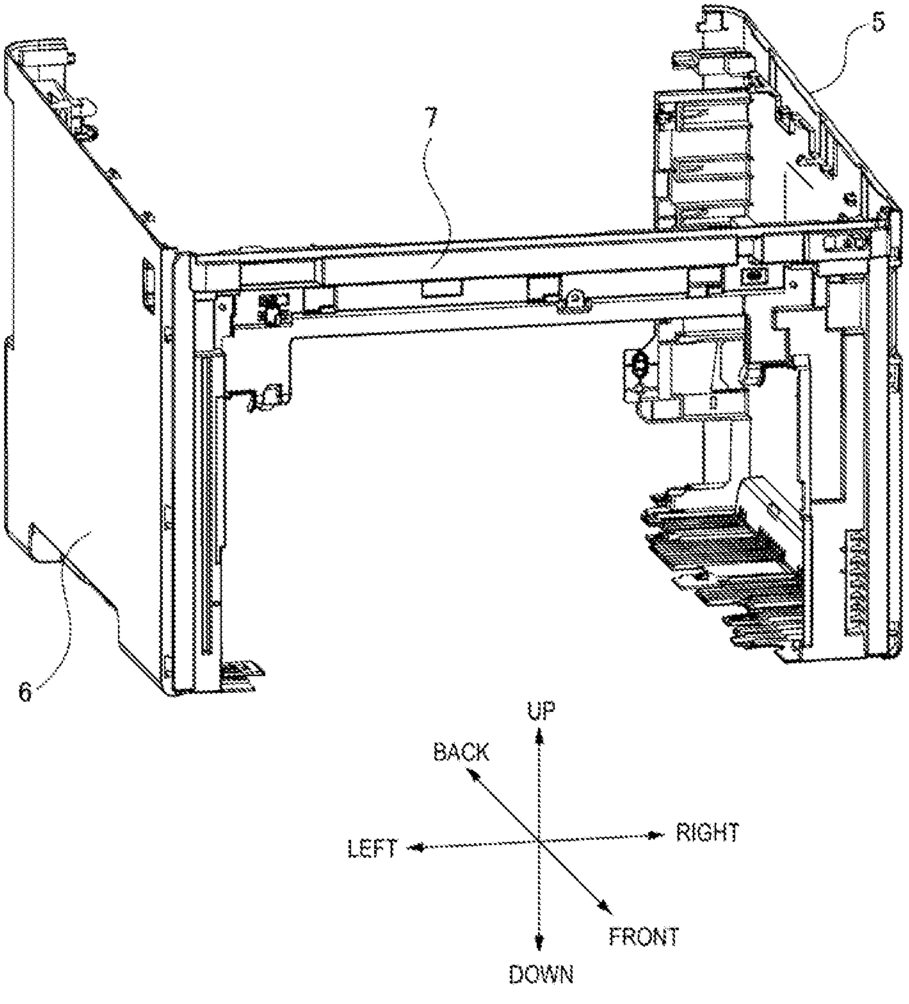
FIG. 4 is a perspective view of the front cover, a left cover, and a right cover of the first embodiment.

Hereinafter, an embodiment of an image forming apparatus to which the present invention is applied will be specifically described with reference to the drawings. FIG. 1 is a perspective view of an image forming apparatus. FIG. 2 is a perspective view of the image forming apparatus in a state where a multi-cover is opened. FIG. 3 is a perspective view of an upper cover and a front cover of the first embodiment. FIG. 4 is a perspective view of the front cover, a left cover, and a right cover of the first embodiment.

Image Forming Apparatus

In FIGS. 1 and 2, in an image forming apparatus 1, a sheet as a recording medium is fed one by one by a feeding portion (not illustrated) from a sheet cassette 4 disposed in a lower portion of an apparatus main body. An image is formed on the sheet by an image forming portion (not illustrated) provided inside the apparatus main body. The sheet on which the image is formed is discharged and stacked on a discharge tray disposed in the upper portion of the apparatus main body by a discharge portion (not illustrated).

The image forming apparatus 1 includes an operation panel 10 on the upper side in front of the apparatus. Various output conditions such as the number of output of the recording media and the image size are input from the operation panel 10 or an external device such as a personal computer connected to the image forming apparatus 1, and the operation of the image forming apparatus 1 is controlled based on these pieces of information.

As illustrated in FIG. 3, the image forming apparatus 1 includes a frame 8 (FIG. 5), a front cover 7 fixed to the front surface of the frame 8, and an upper cover 2 disposed on the upper surface of the frame 8 and having a plurality of engaging portions that is engaged with the front cover 7 fixed to the front surface of the frame 8. As illustrated in FIG. 4, the image forming apparatus 1 includes a left cover 6 that is a side surface cover disposed on the left side surface of the frame 8 and having a plurality of engaging portions engaged with a front cover 7 fixed to the front surface of the frame 8. The image forming apparatus 1 includes a right cover 5 as a side surface cover disposed on the right side surface of the frame 8 and having a plurality of engaging portions engaged with the front cover 7 fixed to the front surface of the frame 8. As illustrated in FIGS. 1 and 2, the front cover 7 is provided with a multi-cover 3 that can be opened and closed.

In the image forming apparatus 1, a feeding portion (not illustrated), an image forming portion (not illustrated), and a discharge portion (not illustrated) are accommodated, and their periphery is surrounded by the upper cover 2, the front cover 7 including the multi-cover 3, the right cover 5, and the left cover 6.

In the following description, it is defined as a front-back direction in which a side on which the front cover 7 is fixed is a front side and an opposite side is a back side. In addition, it is defined as a right-left direction in which one side in a width direction orthogonal to the front-back direction is a right side and the other side is a left side when the image forming apparatus 1 is viewed from the front side. In addition, it is defined as an up-down direction in which an upward direction in a vertical direction orthogonal to the front-back direction and the right-left direction is an upper side and a downward direction is a lower side. The defined forward direction, backward direction, rightward direction, leftward direction, upward direction, and downward direction are shown in the drawings.

Positioning of Frame and Front Cover

Figure 5:
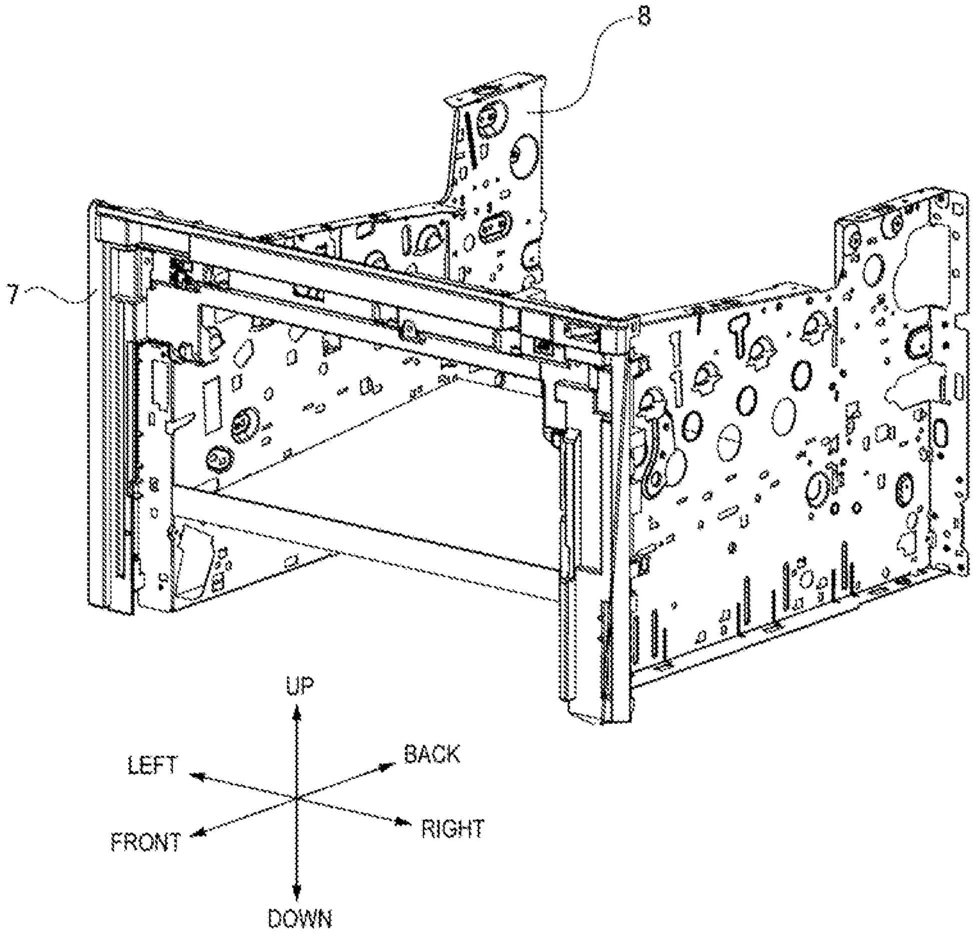
FIG. 5 is a perspective view of a frame and the front cover of the first embodiment.
Figure 6:
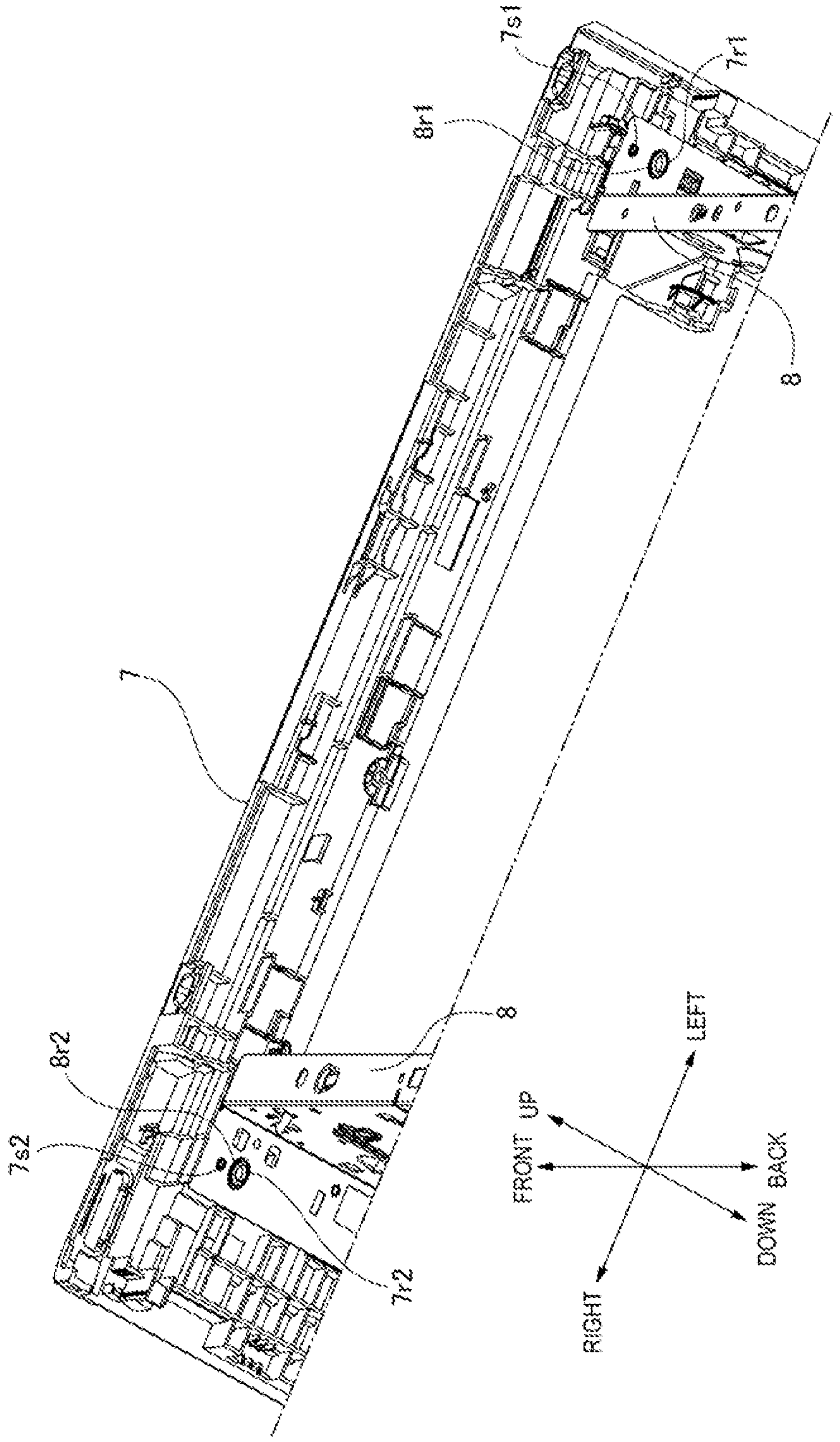
FIG. 6 is a perspective view of the frame and the front cover of the first embodiment.

The positioning of the frame and the front cover will be described with reference to FIGS. 5 and 6. FIG. 5 is a perspective view of the frame and the front cover as viewed from the front side. FIG. 6 is a partial perspective view of the frame and the front cover as viewed from the back side.

The front cover 7 is fixed to the front surface of the frame 8. As illustrated in FIGS. 5 and 6, the front cover 7 includes bosses **7*r*1 and 7*r*2 that are engaging portions engaged with positioning holes 8*r*1 and 8*r*2 that are positioning portions of the frame 8, and fastening holes 7*s*1 and 7*s*2 that are fastening portions for fastening the front cover 7 and the frame 8 with screws. The bosses 7*r*1 and 7*r*2 and the fastening holes 7*s*1 and 7*s*2 are provided on both sides of the front cover 7 in the right-left direction. The front cover 7 is positioned with respect to the frame 8 by fitting the bosses 7*r*1 and 7*r*2 into the positioning holes 8*r*1 and 8*r*2 of the frame 8, and is fixed to the frame 8 by fastening with screws. In this manner, the front cover 7 is disposed on the front surface of the frame 8**.

Upper Side Regulating Portion Included in Front Cover

Figures 7A, 7B, 7C, 7D, 7E, 7F:
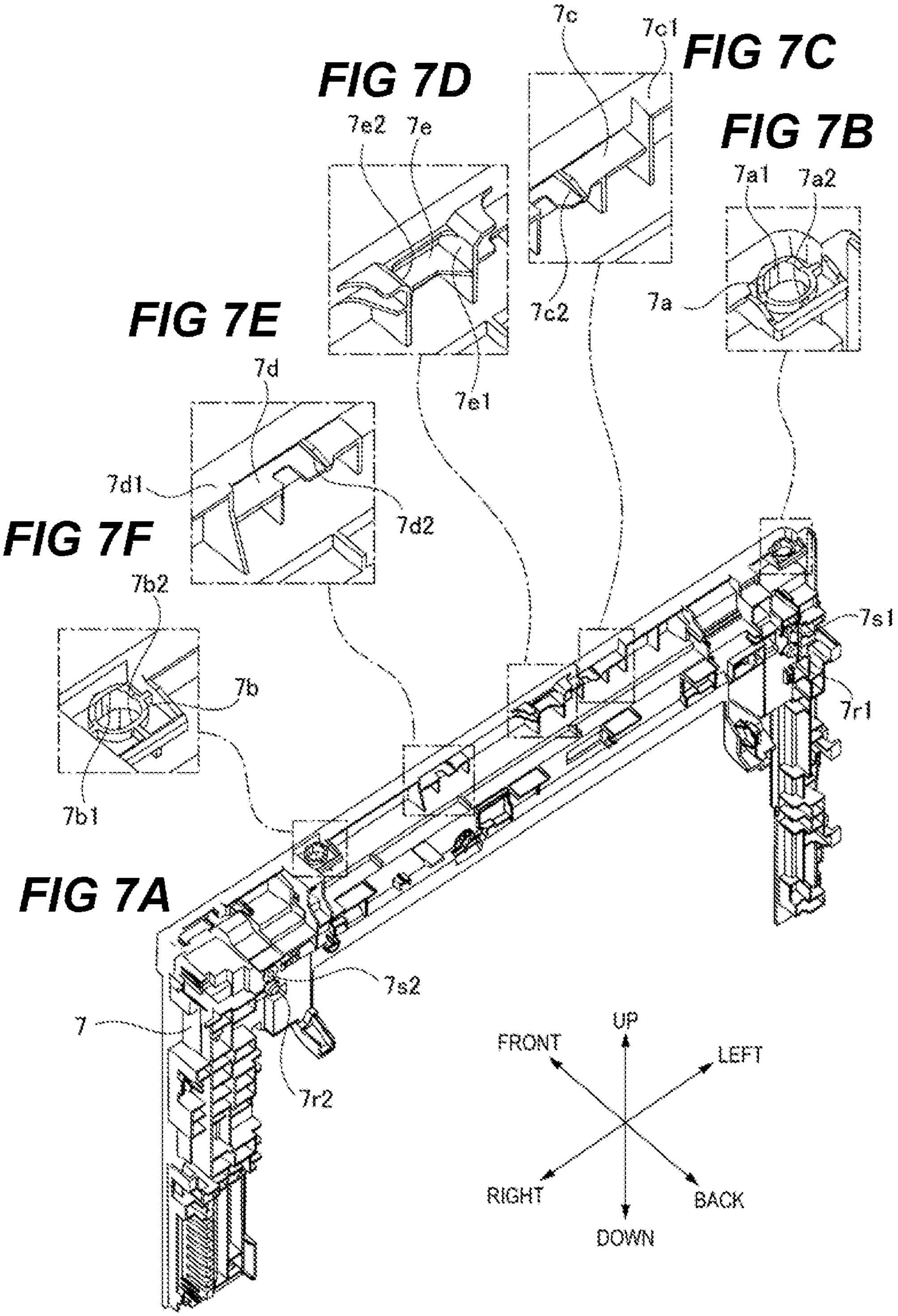
FIGS. 7A to 7F are explanatory views of the front cover of the first embodiment.

The upper side regulating portion included in the front cover will be described with reference to FIGS. 7A to 7F. FIGS. 7A to 7F are explanatory views of the front cover of the first embodiment. FIG. 7A is a perspective view of the front cover as viewed from the back side. FIGS. 7B to 7F are perspective views of respective upper side regulating portions included in the front cover.

As illustrated in FIGS. 7A to 7F, the front cover 7 includes front-back regulating portions **7*a* and 7*b* that regulate the position of the upper cover 2 in the front-back direction, up-down regulating portions 7*c* and 7*d* that regulate the position of the upper cover 2 in the up-down direction, and a right-left regulating portion 7*e* that regulates the position of the upper cover 2** in the right-left direction.

As shown in FIG. 7A, the front-back regulating portions **7*a* and 7*b*, the up-down regulating portions 7*c* and 7*d*, and the right-left regulating portion 7*e* are provided side by side in the right-left direction at the upper side end portion of the front cover 7**.

In the present embodiment, the right-left regulating portion **7*e* is provided at the center in the right-left direction, and the up-down regulating portions 7*c* and 7*d* and the front-back regulating portions 7*a* and 7*b* are sequentially provided on one side and the other side in the right-left direction of the right-left regulating portion 7_e_. In other words, in the front cover 7, the two front-back regulating portions 7_a_ and 7_b_, the two up-down regulating portions 7_c_ and 7_d_, and one right-left regulating portion 7_e_ are provided in the order of the front-back regulating portion 7_a_, the up-down regulating portion 7_c_, the right-left regulating portion 7_e_, the up-down regulating portion 7_d_, and the front-back regulating portion 7**_b_ from one side in the right-left direction.

Front Side Engaging Portion Included in Upper Cover

Figures 8A, 8B, 8C, 8D, 8E, 8F:
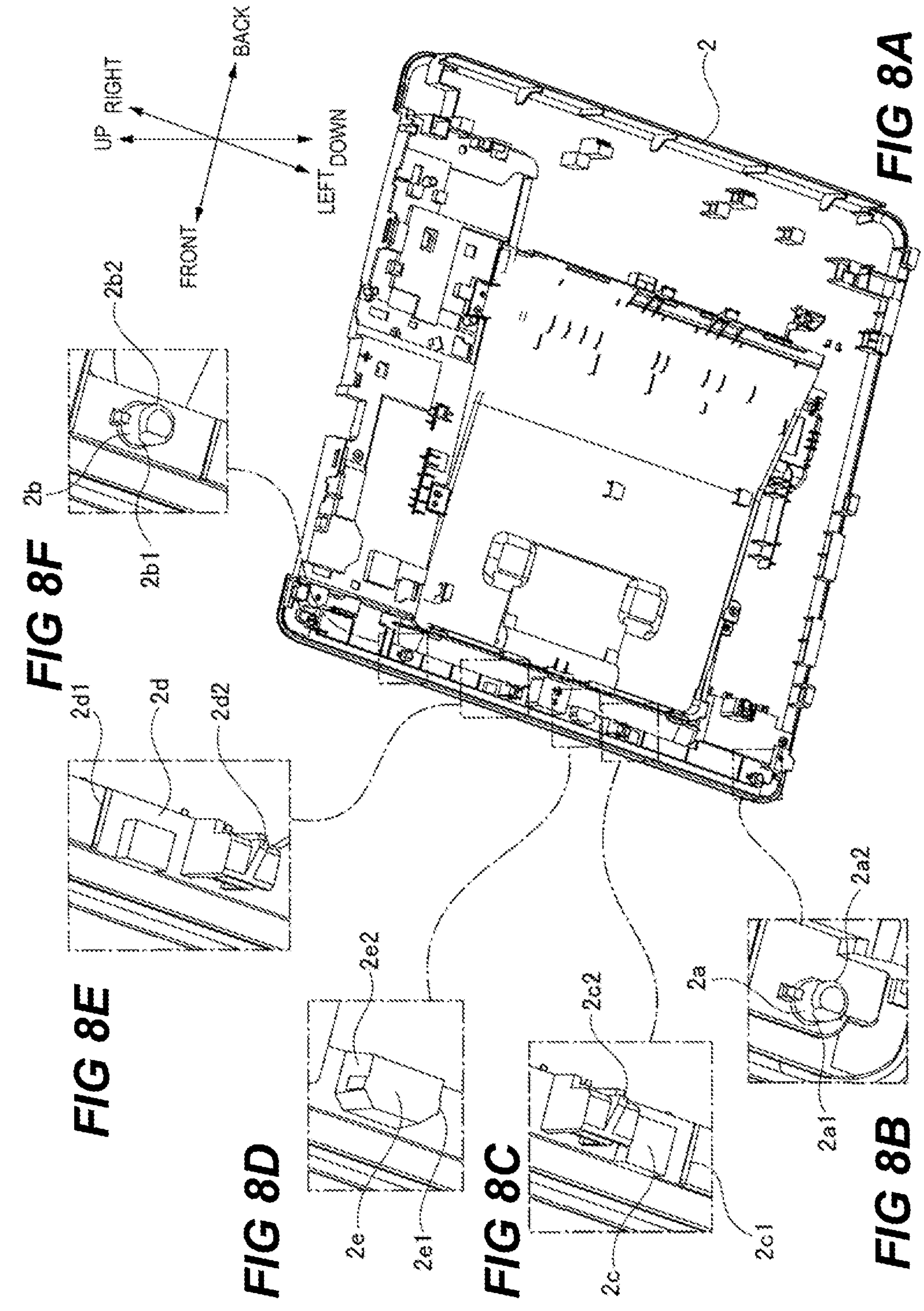
FIGS. 8A to 8F are explanatory views of the upper cover of the first embodiment.

The front side engaging portion included in the upper cover will be described with reference to FIGS. 8A to 8F. FIGS. 8A to 8F are explanatory views of the upper cover of the first embodiment. FIG. 8A is a perspective view of the upper cover as viewed from the lower side. FIGS. 8B to 8F are perspective views of respective front side engaging portions included in the upper cover.

As described above, the upper cover 2 is disposed on the upper surface of the frame 8 and has a plurality of engaging portions that is engaged with the front cover 7 fixed to the front surface of the frame 8. As illustrated in FIGS. 8A to 8F, the upper cover 2 includes first engaging portions 2_a_ and 2_b_, second engaging portions 2_c_ and 2_d_, and a third engaging portion 2_e_ that is engaged with the front cover 7.

As illustrated in FIG. 8A, the first engaging portions 2_a_ and 2_b_, the second engaging portions 2_c_ and 2_d_, and the third engaging portion 2_e_ are provided side by side in the right-left direction at the front side end portion of the upper cover 2.

In the present embodiment, the two first engaging portions 2_a_ and 2_b_, the two second engaging portions 2_c_ and 2_d_, and one third engaging portion 2_e_ are provided at positions corresponding to the two front-back regulating portions 7_a_ and 7_b_, the two up-down regulating portions 7_c_ and 7_d_, and one right-left regulating portion 7_e_ provided in the front cover 7.

Specifically, in the upper cover 2, the two first engaging portions 2_a_ and 2_b_, the two second engaging portions 2_c_ and 2_d_, and one third engaging portion 2_e_ are provided in the order of the first engaging portion 2_a_, the second engaging portion 2_c_, the third engaging portion 2_e_, the second engaging portion 2_d_, and the first engaging portion 2_b_ from one side in the right-left direction.

Then, the front cover 7 regulates the position of the upper cover 2 in the front-back direction, the up-down direction, and the right-left direction by engaging the first engaging portions 2_a_ and 2_b_, the second engaging portions 2_c_ and 2_d_, and the third engaging portion 2_e_ included in the upper cover 2 with the front-back regulating portions 7_a_ and 7_b_, the up-down regulating portions 7_c_ and 7_d_, and the right-left regulating portion 7_e_ of the front cover 7 fixed to the front side of the frame 8, respectively.

Positioning of Front Cover and Upper Cover

Here, with reference to FIGS. 9A to 10G, a configuration in which the front cover 7 regulates the position of the upper cover 2 in the front-back direction, the up-down direction, and the right-left direction by engaging a plurality of engaging portions included in the upper cover 2 with a plurality of regulating portions included in the front cover 7 will be described.

FIGS. 9A to 9F and FIGS. 10A to 10G are cross-sectional views of a state in which the engaging portion of the upper cover and the regulating portion of the front cover are engaged with each other in the first embodiment. FIGS. 9A to 9E are p-p cross-sectional views of FIG. 3. FIGS. 9A, 9E, 10A, and 10G are cross-sectional views of a state in which the front-back regulating portion and the first engaging portion are engaged with each other. FIGS. 9B, 9D, 10B, 10C, 10E, and 10F are cross-sectional views of a state in which the up-down regulating portion and the second engaging portion are engaged with each other. FIGS. 9C and 10D are cross-sectional views of a state in which the right-left regulating portion and the third engaging portion are engaged with each other. FIG. 10A is a q-q cross-sectional view of FIG. 9A. FIG. 10B is an s-s cross-sectional view of FIG. 9B, and FIG. 10C is a t-t cross-sectional view of FIG. 9B. FIG. 10D is a w-w cross-sectional view of FIG. 9C. FIG. 10E is a u-u cross-sectional view of FIG. 9D, and FIG. 10F is a v-v cross-sectional view of FIG. 9D. FIG. 10G is an r-r cross-sectional view of FIG. 9E.

Figure 9A:
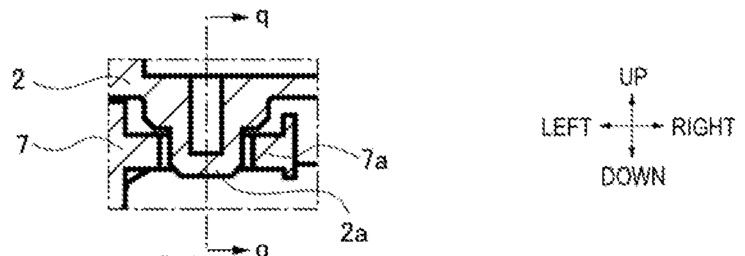
FIGS. 9A to 9E are cross-sectional views of respective attachment shapes of the upper cover and the front cover of the first embodiment.
Figure 9B:
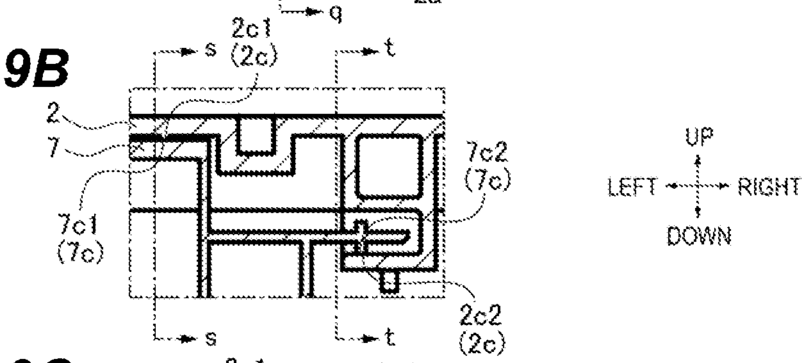
Figure 9C:
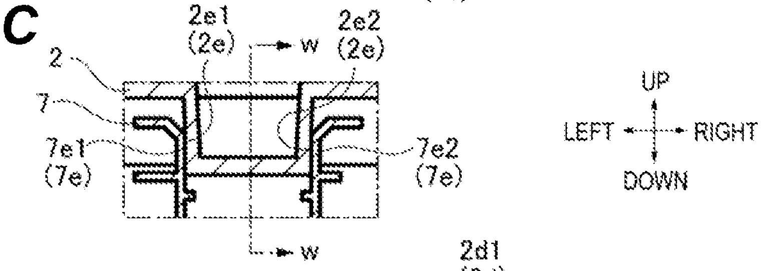
Figure 9D:
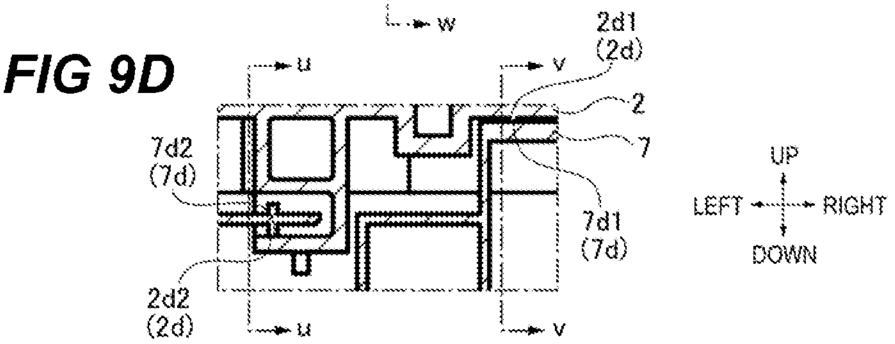
Figure 10A:
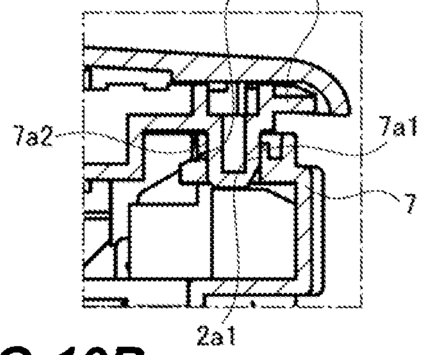
FIGS. 10A to 10G are cross-sectional views of respective attachment shapes of the upper cover and the front cover of the first embodiment.
Figure 10E:
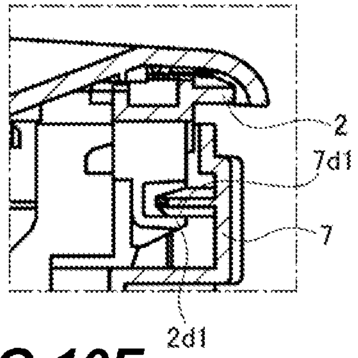
Figure 10B:
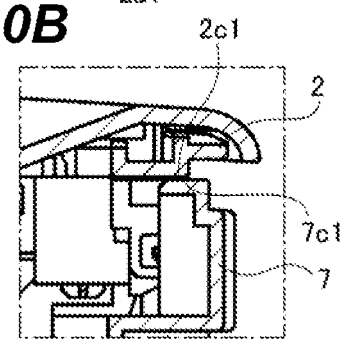
Figure 10F:
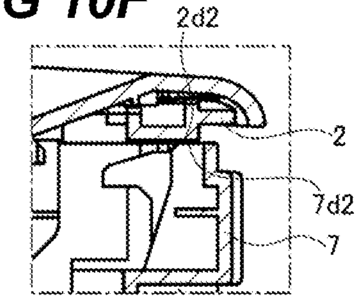
Figure 10C:
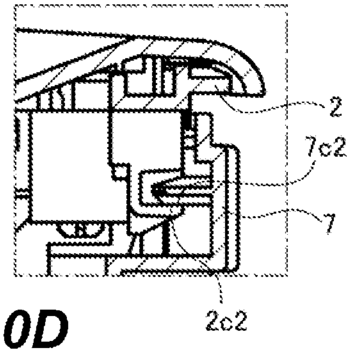
Figure 10G:
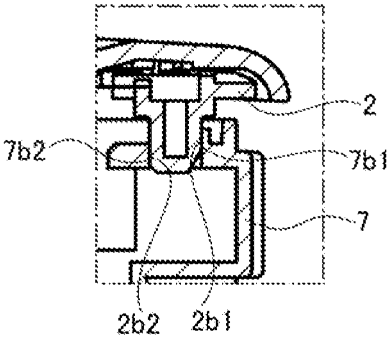
Figure 10D:
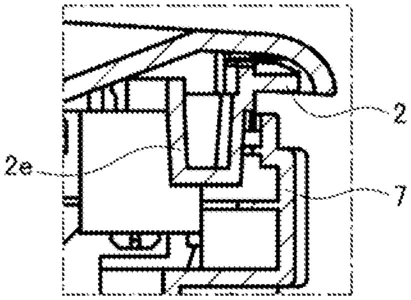

As illustrated in FIGS. 9A and 10A, the front-back regulating portion 7_a_ is engaged with the first engaging portion 2_a_ included in the upper cover 2 to regulate the position of the upper cover 2 in the front-back direction. Specifically, a front side portion 7_a_1 of the front-back regulating portion 7_a_ in the front-back direction abuts on a front side portion 2_a_1 of the first engaging portion 2_a_ in the front-back direction, and a back side portion 7_a_2 of the front-back regulating portion 7_a_ in the front-back direction abuts on a back side portion 2_a_2 of the first engaging portion 2_a_ in the front-back direction, regulating the position of the upper cover 2 in the front-back direction.

Figure 9E:
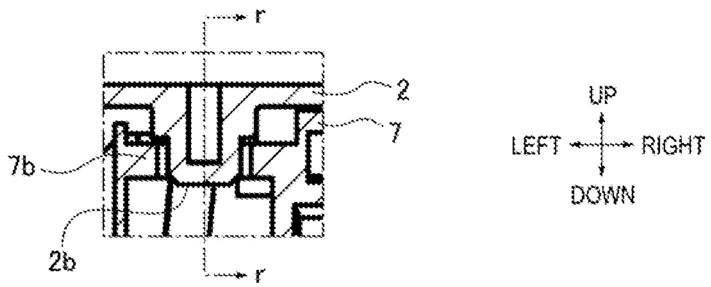

Similarly, as illustrated in FIGS. 9E and 10G, the front-back regulating portion 7_b_ is engaged with the first engaging portion 2_b_ included in the upper cover 2 to regulate the position of the upper cover 2 in the front-back direction. Specifically, a front side portion 7_b_1 of the front-back regulating portion 7_b_ in the front-back direction abuts on the front side portion 2_b_1 of the first engaging portion 2_b_ in the front-back direction, and a back side portion 7_b_2 of the front-back regulating portion 7_b_ in the front-back direction abuts on a back side portion 2_b_2 of the first engaging portion 2_b_ in the front-back direction, regulating the position of the upper cover 2 in the front-back direction.

In this manner, the front cover 7 regulates the position of the upper cover 2 in the front-back direction orthogonal to the right-left direction by the two front-back regulating portions 7_a_ and 7_b_ on one side and the other side in the right-left direction. Here, the right-left direction is a direction along a mating portion (boundary portion) between the front cover 7 and the upper cover 2. In the direction orthogonal to the direction along the mating portion between the covers, two regulating portions regulate different positions in the direction.

As illustrated in FIGS. 9B, 10B, and 10C, the up-down regulating portion 7_c_ is engaged with the second engaging portion 2_c_ included in the upper cover 2 to regulate the position of the upper cover 2 in the up-down direction. Specifically, an upper side portion 7_c_1 of the up-down regulating portion 7_c_ in the up-down direction abuts on an upper side portion 2_c_1 of the second engaging portion 2_c_ in the up-down direction, and a lower side portion 7_c_2 of the up-down regulating portion 7_c_ in the up-down direction abuts on a lower side portion 2_c_2 of the second engaging portion 2_c_ in the up-down direction, regulating the position of the upper cover 2 in the up-down direction.

Similarly, as illustrated in FIGS. 9D, 10E, and 10F, the up-down regulating portion 7_d_ is engaged with the second engaging portion 2_d_ included in the upper cover 2 to regulate the position of the upper cover 2 in the up-down direction. Specifically, an upper side portion 7*d*1 of the up-down regulating portion 7*d* in the up-down direction abuts on an upper side portion 2*d*1 of the second engaging portion 2*d* in the up-down direction, and a lower side portion 7*d*2 of the up-down regulating portion 7*d* in the up-down direction abuts on a lower side portion 2*d*2 of the second engaging portion 2*d* in the up-down direction, regulating the position of the upper cover 2 in the up-down direction.

In this manner, the front cover 7 regulates the position of the upper cover 2 in the up-down direction orthogonal to the right-left direction by the two up-down regulating portions 7*c* and 7*d* on one side and the other side in the right-left direction. As described above, in the direction orthogonal to the direction along the mating portion between the covers, two regulating portions regulate different positions in the direction.

As illustrated in FIGS. 9C and 10D, the right-left regulating portion 7*e* is engaged with the third engaging portion 2*e* included in the upper cover 2 to regulate the position of the upper cover 2 in the right-left direction. Specifically, a left side portion 7*e*1 that is one side in the right-left direction of the right-left regulating portion 7*e* abuts on a left side portion 2*e*1 that is one side of the third engaging portion 2*e*, and a right side portion 7*e*2 that is the other side in the right-left direction of the right-left regulating portion 7*e* abuts on a right side portion 2*e*2 that is the other side of the third engaging portion 2*e* to regulate the position of the upper cover 2 in the right-left direction.

In this manner, the front cover 7 regulates the position of the upper cover 2 in the right-left direction by one right-left regulating portion 7*e* between the other regulating portions in the right-left direction. In the direction orthogonal to the direction along the mating portion between the covers, two regulating portions regulate different positions in the direction, whereas in the direction along the mating portion between the covers, one right-left regulating portion 7*e* regulates the position in the direction.

As described above, according to the present embodiment, the front cover 7 regulates the position of the upper cover 2 in the front-back direction, the up-down direction, and the right-left direction. Therefore, the upper cover 2 can be accurately attached by the front cover 7, the accuracy of the matching between the front cover 7 and the upper cover 2 is enhanced, and the aesthetic appearance of the appearance can be improved.

Left Side Regulating Portion Included in Front Cover

Figures 11A, 11B, 11C, 11D, 11E, 11F:
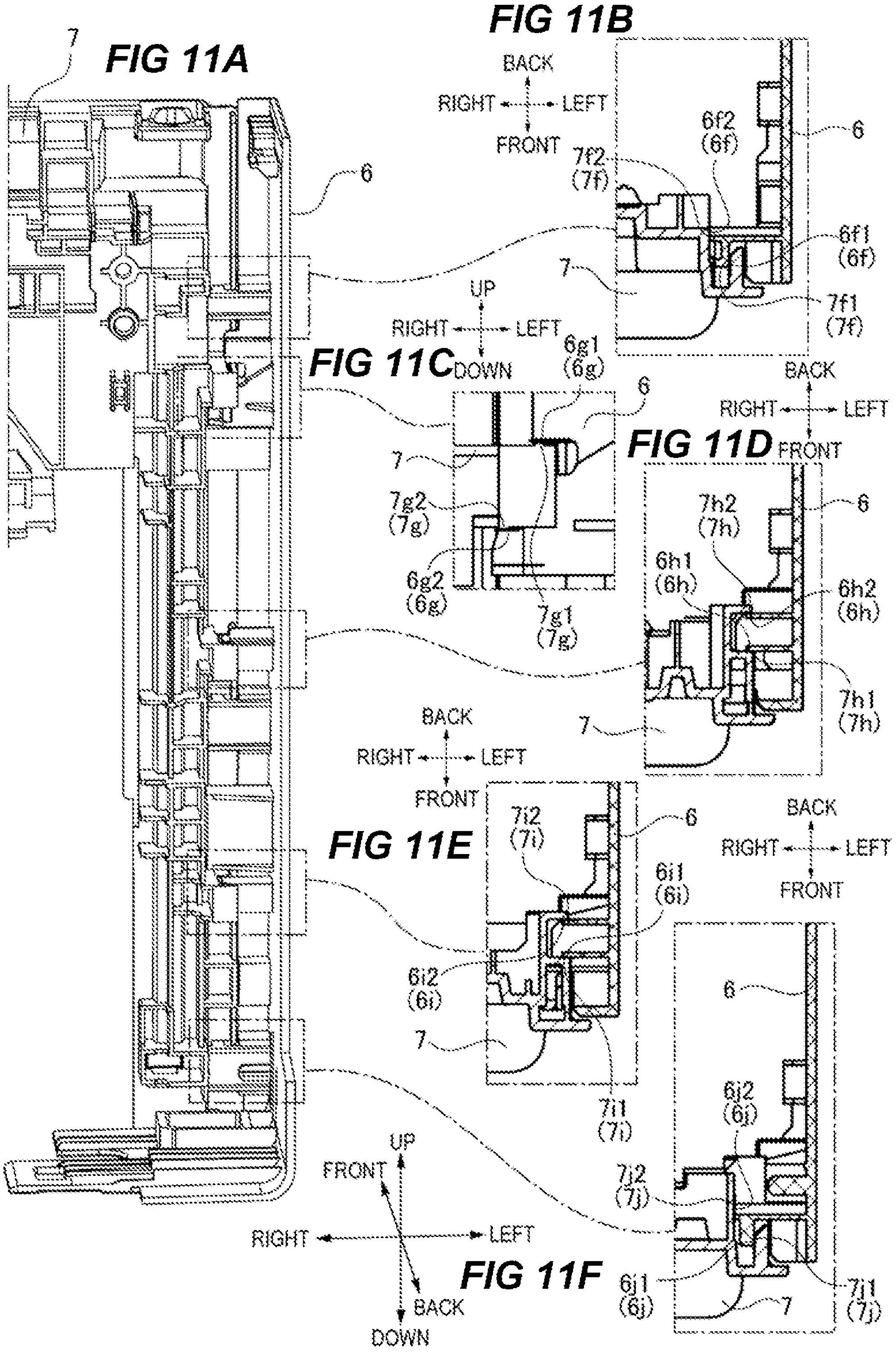
FIGS. 11A to 11F are explanatory views of the front cover and the left cover of the first embodiment.

Next, the left side regulating portion included in the front cover will be described with reference to FIGS. 11A to 11F. FIGS. 11A to 11F are explanatory views of the front cover and the left cover of the first embodiment. FIG. 11A is a perspective view of the front cover and the left cover as viewed from the back side. FIGS. 11B to 11F are cross-sectional views of a state in which the regulating portion of the front cover and the engaging portion of the left cover are engaged with each other.

As illustrated in FIGS. 11A to 11F, the front cover 7 includes front-back regulating portions 7*h* and 7*i* that regulate the position of the left cover 6 in the front-back direction, an up-down regulating portion 7*g* that regulate the position of the left cover 6 in the up-down direction, and right-left regulating portion 7*f* and 7*j* that regulate the position of the left cover 6 in the right-left direction.

As shown in FIG. 11A, the front-back regulating portions 7*h* and 7*i*, the up-down regulating portion 7*g*, and the right-left regulating portion 7*f* and 7*j* are provided side by side in the up-down direction at the left side end portion that is one side in the right-left direction of the front cover 7.

In the present embodiment, the two right-left regulating portion 7*f* and 7*j*, the two front-back regulating portions 7*h* and 7*i*, and one up-down regulating portion 7*g* are provided side by side in the up-down direction at the left side end portion of the front cover.

Specifically, in the front cover 7, the two right-left regulating portion 7*f* and 7*j*, the two front-back regulating portions 7*h* and 7*i*, and one up-down regulating portion 7*g* are provided in the order of the right-left regulating portion 7*f*, the up-down regulating portion 7*g*, the front-back regulating portion 7*h*, the front-back regulating portion 7*i*, and the right-left regulating portion 7*j* from the upper side in the up-down direction.

Front Side Engaging Portion Included in Left Cover

Next, the regulating portion on the front side included in the left cover will be described.

The left cover 6 is disposed on the left side surface of the frame 8 and has a plurality of engaging portions that is engaged with the front cover 7 fixed to the front surface of the frame 8. The left cover 6 includes first engaging portions 6*h* and 6*i*, a second engaging portion 6*g*, and third engaging portions 6*f* and 6*j* as a plurality of engaging portions.

As illustrated in FIG. 11A, the first engaging portions 6*h* and 6*i*, the second engaging portion 6*g*, and the third engaging portions 6*f* and 6*j* are provided side by side in the up-down direction at the front side end portion of the left cover 6.

In the present embodiment, the two third engaging portions 6*f* and 6*j*, the two first engaging portions 6*h* and 6*i*, and one second engaging portion 6*g* are provided at positions corresponding to the two right-left regulating portion 7*f* and 7*j*, the two front-back regulating portions 7*h* and 7*i*, and one up-down regulating portion 7*g* provided in the front cover 7.

Specifically, in the left cover 6, the two third engaging portions 6*f* and 6*j*, the two first engaging portions 6*h* and 6*i*, and one second engaging portion 6*g* are provided in the order of the third engaging portion 6*f*, the second engaging portion 6*g*, the first engaging portion 6*h*, the first engaging portion 6*i*, and the third engaging portion 6*j* from the upper side in the up-down direction.

Then, the front cover 7 regulates the position of the left cover 6 in the front-back direction, the up-down direction, and the right-left direction by engaging the first engaging portions 6*h* and 6*i*, the second engaging portion 6*g*, and the third engaging portions 6*f* and 6*j* included in the left cover 6 with the front-back regulating portions 7*h* and 7*i*, and the up-down regulating portion 7*g*, and the right-left regulating portion 7*f* and 7*j* of the front cover 7 fixed to the front side of the frame 8, respectively.

Positioning of Front Cover and Left Cover

Here, with reference to FIGS. 11A to 11F, a configuration in which the front cover 7 regulates the position of the left cover 6 in the front-back direction, the up-down direction, and the right-left direction by engaging a plurality of engaging portions included in the left cover 6 with a plurality of regulating portions included in the front cover 7 will be described.

As illustrated in FIG. 11D, the front-back regulating portion 7*h* is engaged with the first engaging portion 6*h* included in the left cover 6 to regulate the position of the left cover 6 in the front-back direction. Specifically, a front side portion 7*h*1 of the front-back regulating portion 7*h* in the front-back direction abuts on a front side portion 6*h*1 of the first engaging portion 6*h* in the front-back direction, and a back side portion 7*h*2 of the front-back regulating portion 7*h* in the front-back direction abuts on a back side portion 6*h*2 of the first engaging portion 6*h* in the front-back direction, regulating the position of the left cover 6 in the front-back direction.

Similarly, as illustrated in FIG. 11E, the front-back regulating portion 7*h* is engaged with the first engaging portion 6*i* included in the left cover 6 to regulate the position of the left cover 6 in the front-back direction. Specifically, a front side portion 7*i*1 of the front-back regulating portion 7*i* in the front-back direction abuts on a front side portion 6*i*1 of the first engaging portion 6*i* in the front-back direction, and a back side portion 7*i*2 of the front-back regulating portion 7*i* in the front-back direction abuts on a back side portion 6*i*2 of the first engaging portion 6*i* in the front-back direction, regulating the position of the left cover 6 in the front-back direction.

In this manner, the front cover 7 regulates the position of the left cover 6 in the front-back direction orthogonal to the up-down direction by the two front-back regulating portions 7*h* and 7*i* on one side and the other side in the up-down direction. Here, the up-down direction is a direction along a mating portion (boundary portion) between the front cover 7 and the left cover 6. In the direction orthogonal to the direction along the mating portion between the covers, two regulating portions regulate different positions in the direction.

As illustrated in FIG. 11C, the up-down regulating portion 7*g* is engaged with the second engaging portion 6*g* included in the left cover 6 to regulate the position of the left cover 6 in the up-down direction. Specifically, an upper side portion 7*g*1 of the up-down regulating portion 7*g* in the up-down direction abuts on an upper side portion 6*g*1 of the second engaging portion 6*g* in the up-down direction, and a lower side portion 7*g*2 of the up-down regulating portion 7*g* in the up-down direction abuts on a lower side portion 6*g*2 of the second engaging portion 6*g* in the up-down direction, regulating the position of the left cover 6 in the up-down direction.

In this manner, the front cover 7 regulates the position of the left cover 6 in the up-down direction by one up-down regulating portion 7*g* between the other regulating portions in the up-down direction. In the direction orthogonal to the direction along the mating portion between the covers, two regulating portions regulate different positions in the direction, whereas in the direction along the mating portion between the covers, one up-down regulating portion 7*g* regulates the position in the direction.

As illustrated in FIG. 11B, the right-left regulating portion 7*f* is engaged with the third engaging portion 6*f* included in the left cover 6 to regulate the position of the left cover 6 in the right-left direction. Specifically, a left side portion 7*f*1 that is one side in the right-left direction of the right-left regulating portion 7*f* abuts on a left side portion 6*f*1 that is one side in the right-left direction of the third engaging portion 6*f*, and a right side portion 7*f*2 that is the other side in the right-left direction of the right-left regulating portion 7*f* abuts on a right side portion 6*f*2 that is the other side in the right-left direction of the third engaging portion 6*f* to regulate the position of the left cover 6 in the right-left direction.

As illustrated in FIG. 11F, the right-left regulating portion 7*j* is engaged with the third engaging portion 6*j* included in the left cover 6 to regulate the position of the left cover 6 in the right-left direction. Specifically, a left side portion 7*j*1 that is one side in the right-left direction of the right-left regulating portion 7*j* abuts on a left side portion 6*j*1 that is one side in the right-left direction of the third engaging portion 6*j*, and a right side portion 7*j*2 that is the other side in the right-left direction of the right-left regulating portion 7*j* abuts on a right side portion 6*j*2 that is the other side in the right-left direction of the third engaging portion 6*j* to regulate the position of the left cover 6 in the right-left direction.

In this manner, the front cover 7 regulates the position of the left cover 6 in the right-left direction orthogonal to the up-down direction by the two right-left regulating portion 7*f* and 7*j* on one side and the other side in the up-down direction. As described above, in the direction orthogonal to the direction along the mating portion between the covers, two regulating portions regulate different positions in the direction.

As described above, according to the present embodiment, the front cover 7 regulates the position of the left cover 6 in the front-back direction, the up-down direction, and the right-left direction. Therefore, the left cover 6 can be accurately attached by the front cover 7, the accuracy of the matching between the front cover 7 and the left cover 6 is enhanced, and the aesthetic appearance of the appearance can be improved.

Right Side Regulating Portion Included in Front Cover

Figures 12A, 12B, 12C, 12D, 12E, 12F:
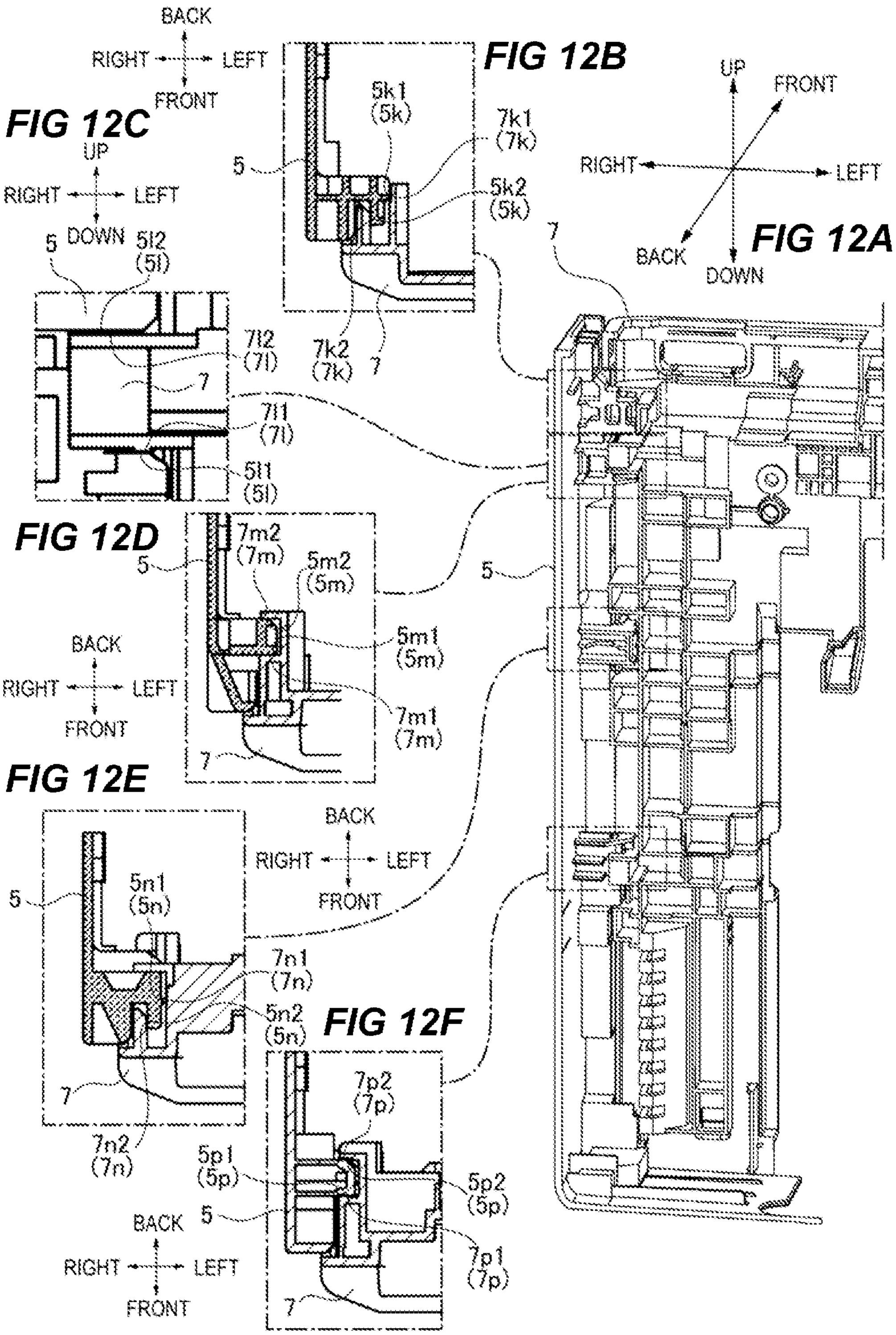
FIGS. 12A to 12F are explanatory views of the front cover and the right cover of the first embodiment.
Figure 13A:
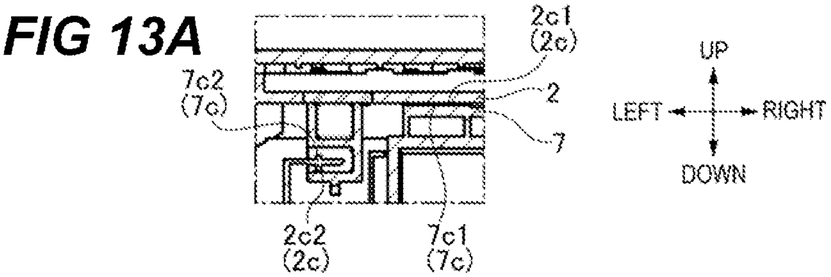
FIGS. 13A to 13E are cross-sectional views of respective attachment shapes of the upper cover and the front cover of a second embodiment.
Figure 13B:
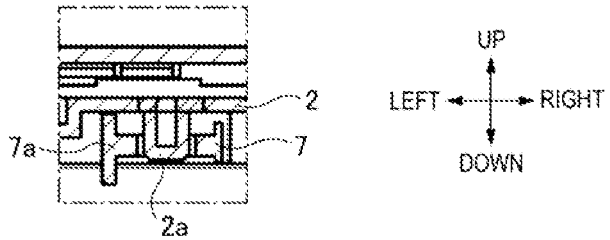
Figure 13C:
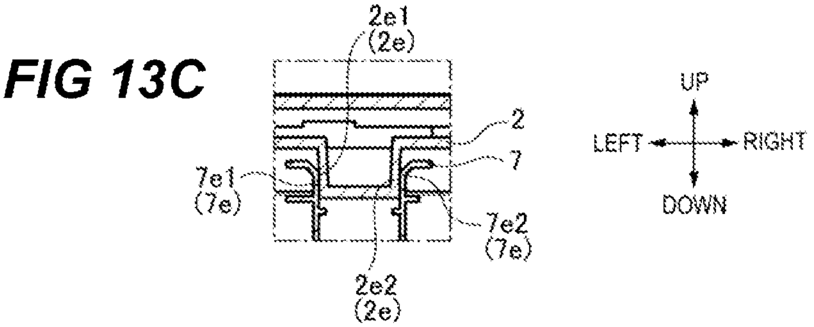
Figure 13D:
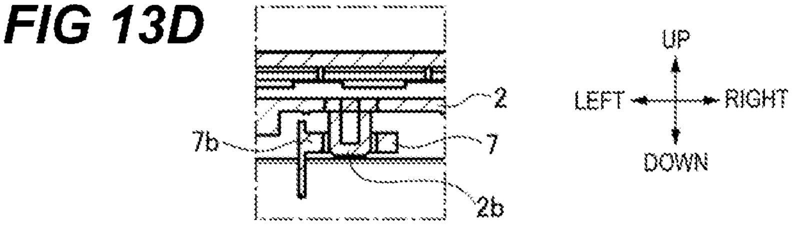
Figure 13E:
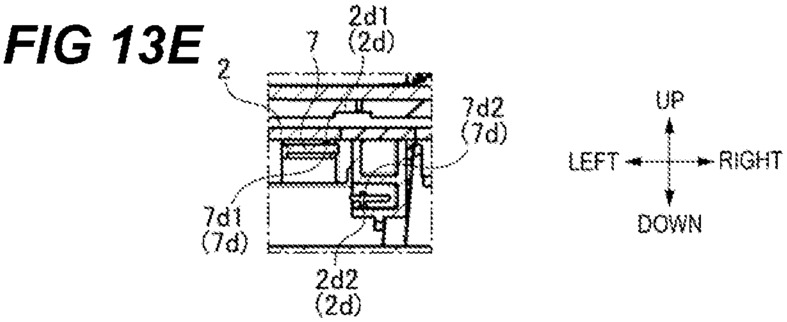
Figures 14A, 14B, 14C, 14D, 14E, 14F:
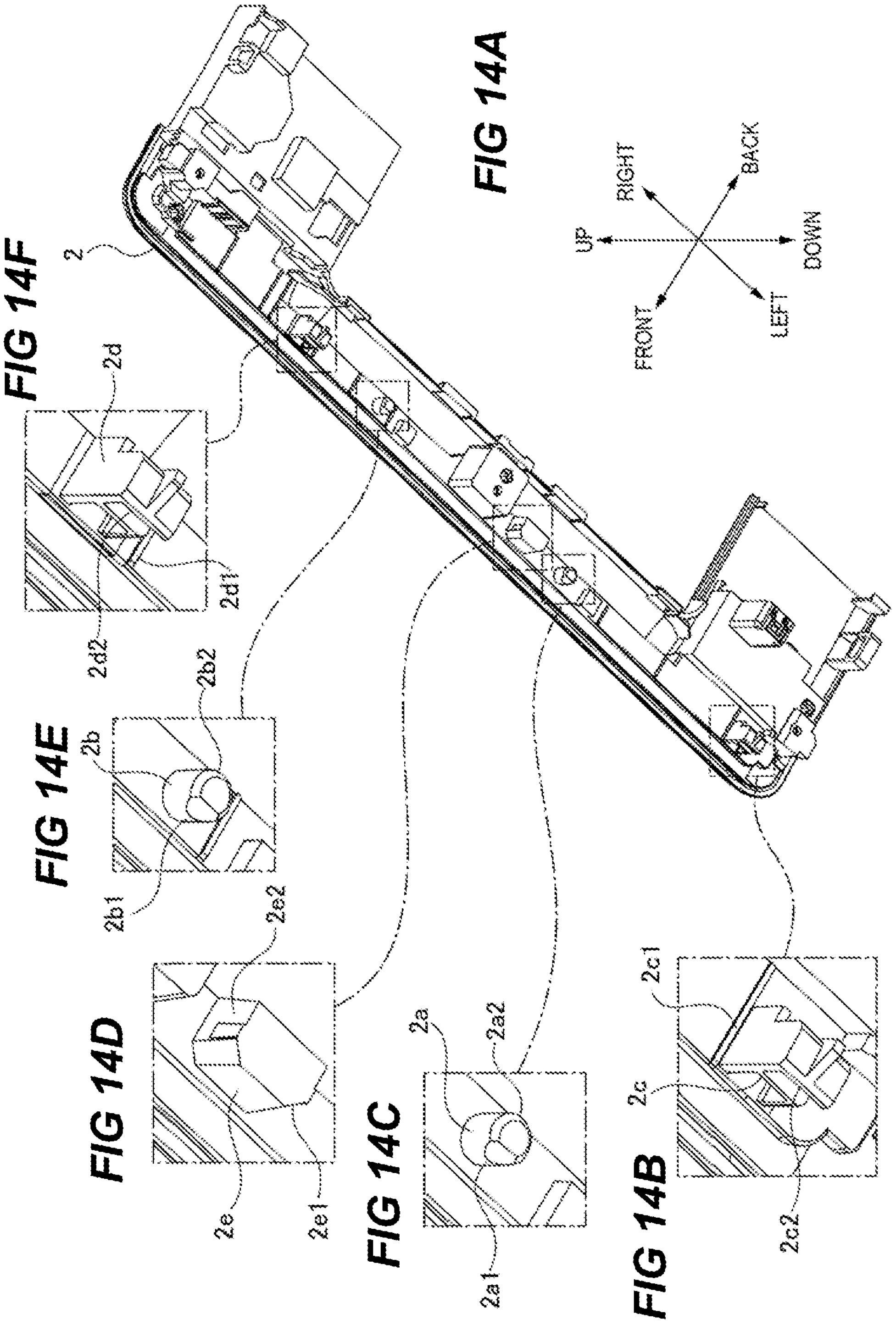
FIGS. 14A to 14F are perspective views of the upper cover of the second embodiment.
Figures 15A, 15B, 15C, 15D, 15E, 15F:
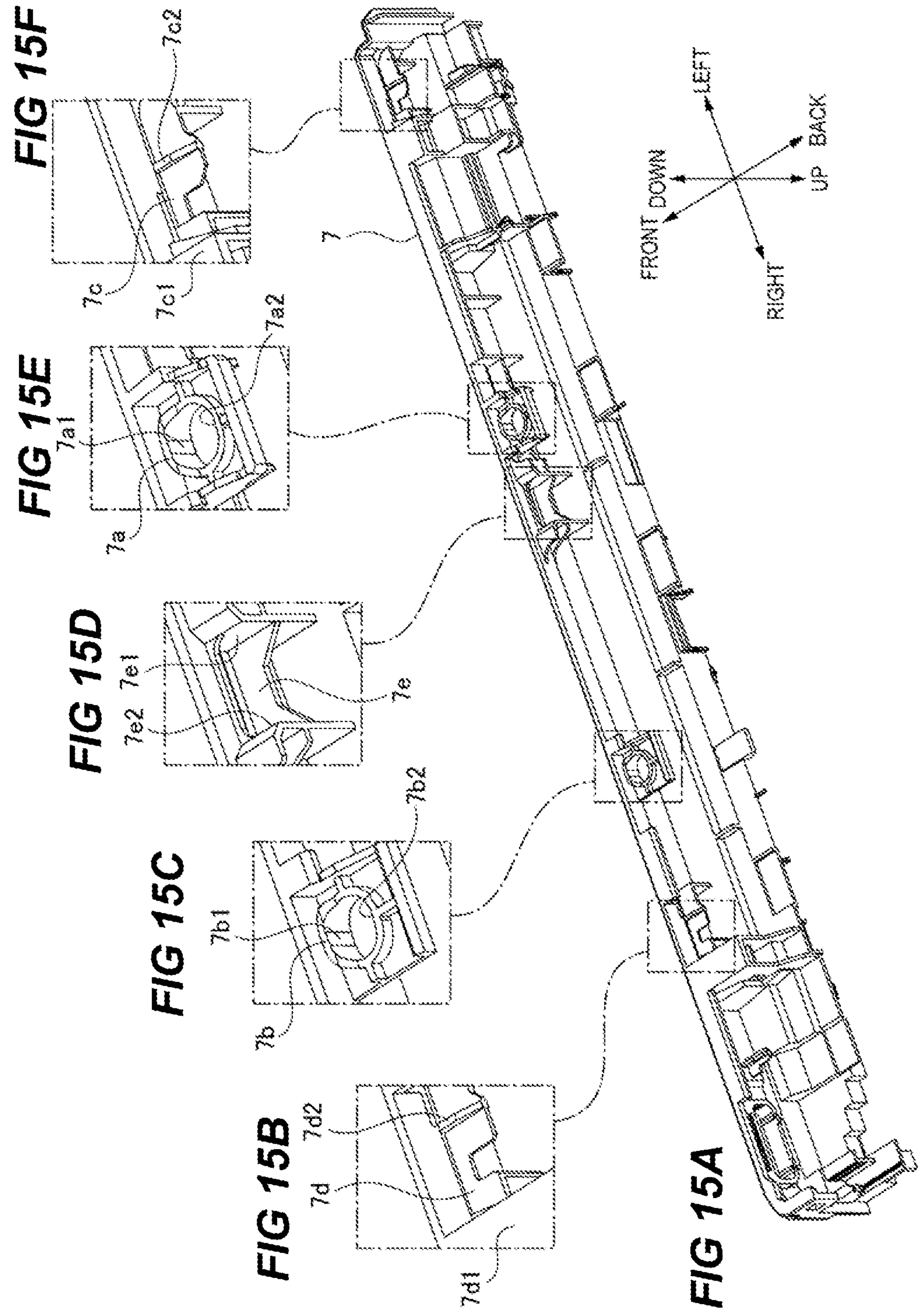
FIGS. 15A to 15F are perspective views of the front cover of the second embodiment.

Next, the right side regulating portion included in the front cover will be described with reference to FIGS. 12A to 12F. FIGS. 12A to 12F are explanatory views of the front cover and the right cover of the first embodiment. FIG. 12A is a perspective view of the front cover and the right cover as viewed from the back side. FIGS. 12B to 12F are cross-sectional views of a state in which the regulating portion of the front cover and the engaging portion of the right cover are engaged with each other.

As illustrated in FIGS. 12A to 12F, the front cover 7 includes front-back regulating portions 7*m* and 7*p* that regulate the position of the right cover 5 in the front-back direction, up-down regulating portion 7*l* that regulates the position of the right cover 5 in the up-down direction, and right-left regulating portions 7*k* and 7*n* that regulate the position of the right cover 5 in the right-left direction.

As shown in FIG. 12A, the front-back regulating portions 7*m* and 7*p*, the up-down regulating portion 7*l*, and the right-left regulating portions 7*k* and 7*n* are provided side by side in the up-down direction at the right side end portion that is the other side in the right-left direction of the front cover 7.

In the present embodiment, the two right-left regulating portions 7*k* and 7*n*, the two front-back regulating portions 7*m* and 7*p*, and one up-down regulating portion 7*l* are provided side by side in the up-down direction at the right side end portion of the front cover.

Specifically, in the front cover 7, the two right-left regulating portions 7*k* and 7*n*, the two front-back regulating portions 7*m* and 7*p*, and one up-down regulating portion 7*l* are provided in the order of the right-left regulating portion 7*k*, the up-down regulating portion 7*l*, the front-back regulating portion 7*m*, the right-left regulating portion 7*n*, and the front-back regulating portion 7*p* from the upper side in the up-down direction.

Front Side Engaging Portion Included in Right Cover

Next, the regulating portion on the front side included in the right cover will be described.

The right cover 5 is disposed on the right side surface of the frame 8 and has a plurality of engaging portions that is engaged with the front cover 7 fixed to the front surface of the frame 8. The right cover 5 includes first engaging portions 5*m* and 5*p*, a second engaging portion 5*l*, and third engaging portions 5*k* and 5*n* as a plurality of engaging portions.

As illustrated in FIG. 12A, the first engaging portions 5*m* and 5*p*, the second engaging portion 5*l*, and the third engaging portions 5*k* and 5*n* are provided side by side in the up-down direction at the front side end portion of the right cover 5.

In the present embodiment, the two third engaging portions 5*k* and 5*n*, the two first engaging portions 5*m* and 5*p*, and one second engaging portion 5*l* are provided at positions corresponding to the two right-left regulating portions 7*k* and 7*n*, the two front-back regulating portions 7*m* and 7*p*, and one up-down regulating portion 7*l* provided in the front cover 7.

Specifically, in the right cover 5, the two third engaging portions 5*k* and 5*n*, the two first engaging portions 5*m* and 5*p*, and one second engaging portion 5*l* are provided in the order of the third engaging portion 5*k*, the second engaging portion 5*l*, the first engaging portion 5*m*, the third engaging portion 5*n*, and the first engaging portion 5*p* from the upper side in the up-down direction.

Then, the front cover 7 regulates the position of the right cover 5 in the front-back direction, the up-down direction, and the right-left direction by engaging the first engaging portions 5*m* and 5*p*, the second engaging portion 5*l*, and the third engaging portions 5*k* and 5*n* included in the right cover 5 with the front-back regulating portions 7*m* and 7*p*, the up-down regulating portion 7*l*, and the right-left regulating portions 7*k* and 7*n* of the front cover 7 fixed to the front side of the frame 8, respectively.

Positioning of Right Cover by Front Cover

Here, with reference to FIGS. 12A to 12F, a configuration in which the front cover 7 regulates the position of the right cover 5 in the front-back direction, the up-down direction, and the right-left direction by engaging a plurality of engaging portions included in the right cover 5 with a plurality of regulating portions included in the front cover 7 will be described.

As illustrated in FIG. 12D, the front-back regulating portion 7*m* is engaged with the first engaging portion 5*m* included in the right cover 5 to regulate the position of the right cover 5 in the front-back direction. Specifically, a front side portion 7*m*1 of the front-back regulating portion 7*m* in the front-back direction abuts on a front side portion 5*m*1 of the first engaging portion 5*m* in the front-back direction, and a back side portion 7*m*2 of the front-back regulating portion 7*m* in the front-back direction abuts on a back side portion 5*m*2 of the first engaging portion 5*m* in the front-back direction, regulating the position of the right cover 5 in the front-back direction.

Similarly, as illustrated in FIG. 12F, the front-back regulating portion 7*p* is engaged with the first engaging portion 5*p* included in the right cover 5 to regulate the position of the right cover 5 in the front-back direction. Specifically, a front side portion 7*p*1 of the front-back regulating portion 7*p* in the front-back direction abuts on a front side portion 5*p*1 of the first engaging portion 5*p* in the front-back direction, and a back side portion 7*p*2 of the front-back regulating portion 7*p* in the front-back direction abuts on a back side portion 5*p*2 of the first engaging portion 5*p* in the front-back direction, regulating the position of the right cover 5 in the front-back direction.

In this manner, the front cover 7 regulates the position of the right cover 5 in the front-back direction orthogonal to the up-down direction by the two front-back regulating portions 7*m* and 7*p* on one side and the other side in the up-down direction. Here, the up-down direction is a direction along a mating portion (boundary portion) between the front cover 7 and the right cover 5. In the direction orthogonal to the direction along the mating portion between the covers, two regulating portions regulate different positions in the direction.

As illustrated in FIG. 12C, the up-down regulating portion 7*l* is engaged with the second engaging portion 5*l* included in the right cover 5 to regulate the position of the right cover 5 in the up-down direction. Specifically, an upper side portion 7*l*1 of the up-down regulating portion 7*l* in the up-down direction abuts on an upper side portion 5*l*1 of the second engaging portion 5*l* in the up-down direction, and a lower side portion 7*l*2 of the up-down regulating portion 7*l* in the up-down direction abuts on a lower side portion 5*l*2 of the second engaging portion 5*l* in the up-down direction, regulating the position of the right cover 5 in the up-down direction.

In this manner, the front cover 7 regulates the position of the right cover 5 in the up-down direction by one up-down regulating portion 7*l* between the other regulating portions in the up-down direction. In the direction orthogonal to the direction along the mating portion between the covers, two regulating portions regulate different positions in the direction, whereas in the direction along the mating portion between the covers, one up-down regulating portion 7*l* regulates the position in the direction.

As illustrated in FIG. 12B, the right-left regulating portion 7*k* is engaged with the third engaging portion 5*k* included in the right cover 5 to regulate the position of the right cover 5 in the right-left direction. Specifically, a left side portion 7*k*1 that is one side in the right-left direction of the right-left regulating portion 7*k* abuts on a left side portion 5*k*1 that is one side in the right-left direction of the third engaging portion 5*k*, and a right side portion 7*k*2 that is the other side in the right-left direction of the right-left regulating portion 7*k* abuts on a right side portion 5*k*2 that is the other side in the right-left direction of the third engaging portion 5*k* to regulate the position of the right cover 5 in the right-left direction.

Similarly, as illustrated in FIG. 12E, the right-left regulating portion 7*n* is engaged with the third engaging portion 5*n* included in the right cover 5 to regulate the position of the right cover 5 in the right-left direction. Specifically, a left side portion 7*n*1 that is one side in the right-left direction of the right-left regulating portion 7*n* abuts on a left side portion 5*n*1 that is one side in the right-left direction of the third engaging portion 5*n*, and a right side portion 7*n*2 that is the other side in the right-left direction of the right-left regulating portion 7*n* abuts on a right side portion 5*n*2 that is the other side in the right-left direction of the third engaging portion 5*n* to regulate the position of the right cover 5 in the right-left direction.

In this manner, the front cover 7 regulates the position of the right cover 5 in the right-left direction orthogonal to the up-down direction by the two right-left regulating portions 7*k* and 7*n* on one side and the other side in the up-down direction. As described above, in the direction orthogonal to the direction along the mating portion between the covers, two regulating portions regulate different positions in the direction.

As described above, according to the present embodiment, the front cover 7 regulates the position of the right cover 5 in the front-back direction, the up-down direction, and the right-left direction. Therefore, the front cover 7 can be accurately attached by the right cover 5, the accuracy of the matching between the front cover 7 and the right cover 5 is enhanced, and the aesthetic appearance of the appearance can be improved.

Second Embodiment

An image forming apparatus according to the second embodiment will be described with reference to FIGS. 13A to 15F. The image forming apparatus according to the second embodiment is different from the configuration of the first embodiment in the arrangement order in the right-left direction of the plurality of regulating portions included in the front cover and the plurality of engaging portions included in the upper cover. Since other configurations are similar to those of the above-described embodiment, members having equivalent functions are denoted by the same reference numerals, and description is omitted.

FIGS. 13A to 13E are cross-sectional views illustrating a state in which the regulating portion of the front cover and the engaging portion of the upper cover are engaged with each other in the second embodiment, and are cross-sectional views corresponding to the p-p cross section of the mating portion between the front cover and the upper cover illustrated in FIG. 3. FIGS. 14A to 14F are perspective views of the upper cover of the second embodiment, illustrating a plurality of engaging portions included in the upper cover. FIGS. 15A to 15F are perspective views of the front cover of the second embodiment, illustrating a plurality of regulating portions included in the front cover.

In the first embodiment, the front-back regulating portion, the up-down regulating portion, and the right-left direction included in the front cover are provided in the order of the front-back regulating portion, the up-down regulating portion, the right-left regulating portion, the up-down regulating portion, and the front-back regulating portion from the left side in the right-left direction. On the other hand, in the second embodiment, the regulating portions are provided as follows.

In the front cover 7 of the second embodiment, the two front-back regulating portions 7*a* and 7*b*, the two up-down regulating portions 7*c* and 7*d*, and one right-left regulating portion 7*e* are provided in the order of the up-down regulating portion 7*c*, the front-back regulating portion 7*a*, the right-left regulating portion 7*e*, the front-back regulating portion 7*b*, and the up-down regulating portion 7*d* from the left side that is one side in the right-left direction.

In the upper cover 2 of the second embodiment, the two first engaging portions 2*a* and 2*b*, the two second engaging portions 2*c* and 2*d*, and one third engaging portion 2*e* are provided in the order of the second engaging portion 2*c*, the first engaging portion 2*a*, the third engaging portion 2*e*, the first engaging portion 2*b*, and the second engaging portion 2*d* from the left side that is one side in the right-left direction.

In the front cover 7 of the first embodiment, the up-down regulating portions 7*c* and 7*d* are provided on both sides of the right-left regulating portion 7*e* in the right-left direction, and the front-back regulating portions 7*a* and 7*b* are provided outside. On the other hand, in the front cover 7 of the second embodiment, the front-back regulating portions 7*a* and 7*b* are provided on both sides of the right-left regulating portion 7*e* in the right-left direction, and the up-down regulating portions 7*c* and 7*d* are provided outside.

As described above, also in the present embodiment, the front cover 7 regulates the position of the upper cover 2 in the front-back direction, the up-down direction, and the right-left direction. Therefore, the upper cover 2 can be accurately attached by the front cover 7, the accuracy of the matching between the front cover 7 and the upper cover 2 is enhanced, and the aesthetic appearance of the appearance can be improved.

Third Embodiment

An image forming apparatus according to the third embodiment will be described with reference to FIGS. 16 to 18F. In the image forming apparatus according to the third embodiment, an image reading unit that reads image information is disposed in an upper portion of the upper cover. Since other configurations are similar to those of the above-described embodiment, members having equivalent functions are denoted by the same reference numerals, and description is omitted.

Figure 16:
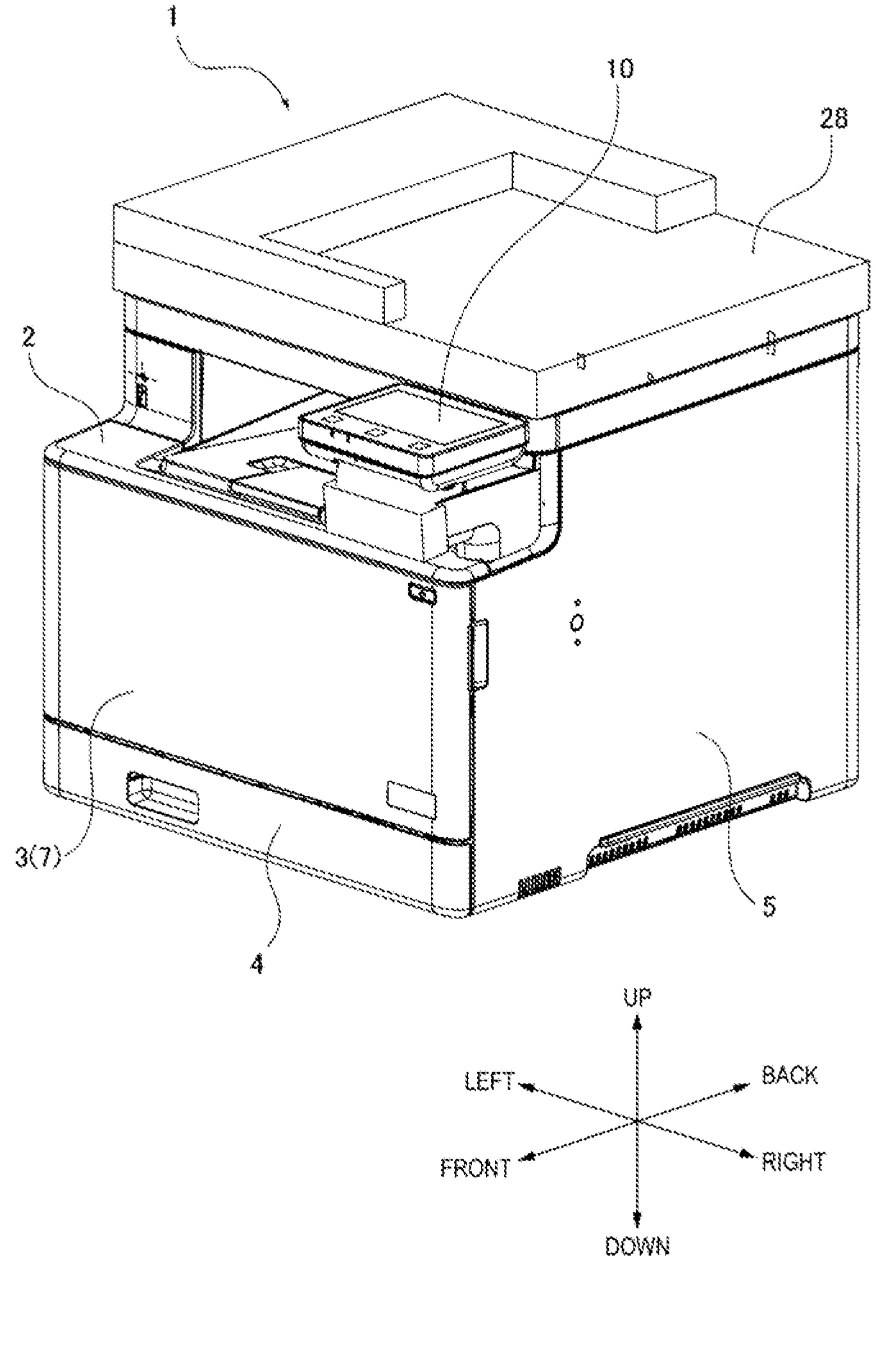
FIG. 16 is an explanatory view of an image forming apparatus of a third embodiment.
Figure 17:
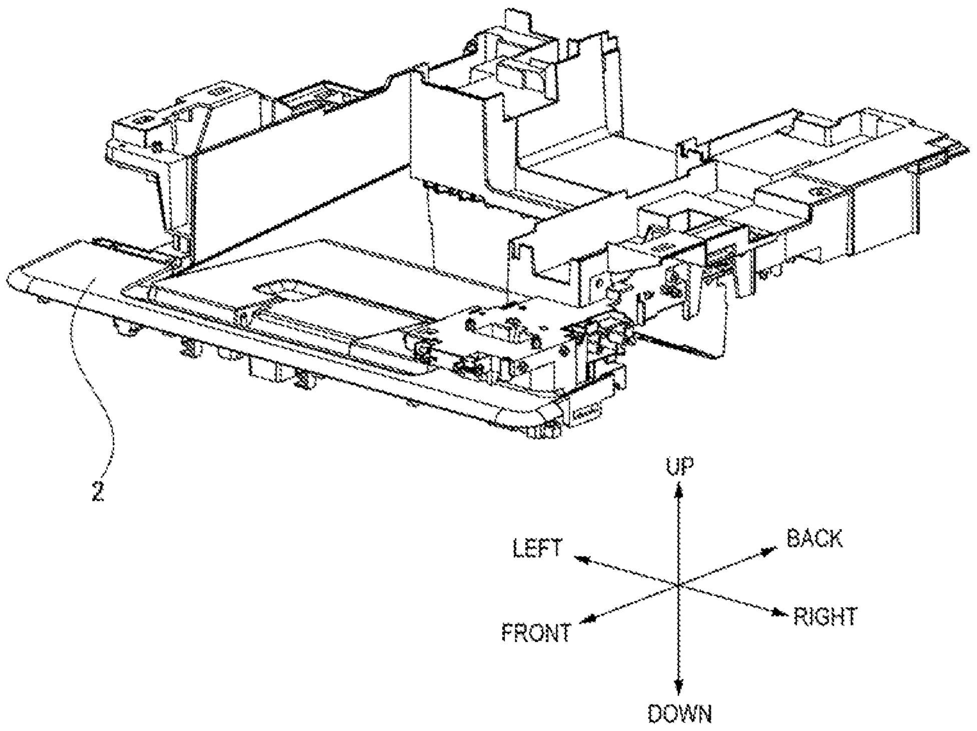
FIG. 17 is a perspective view of an upper cover of the third embodiment.
Figures 18A, 18B, 18C, 18D, 18E, 18F:
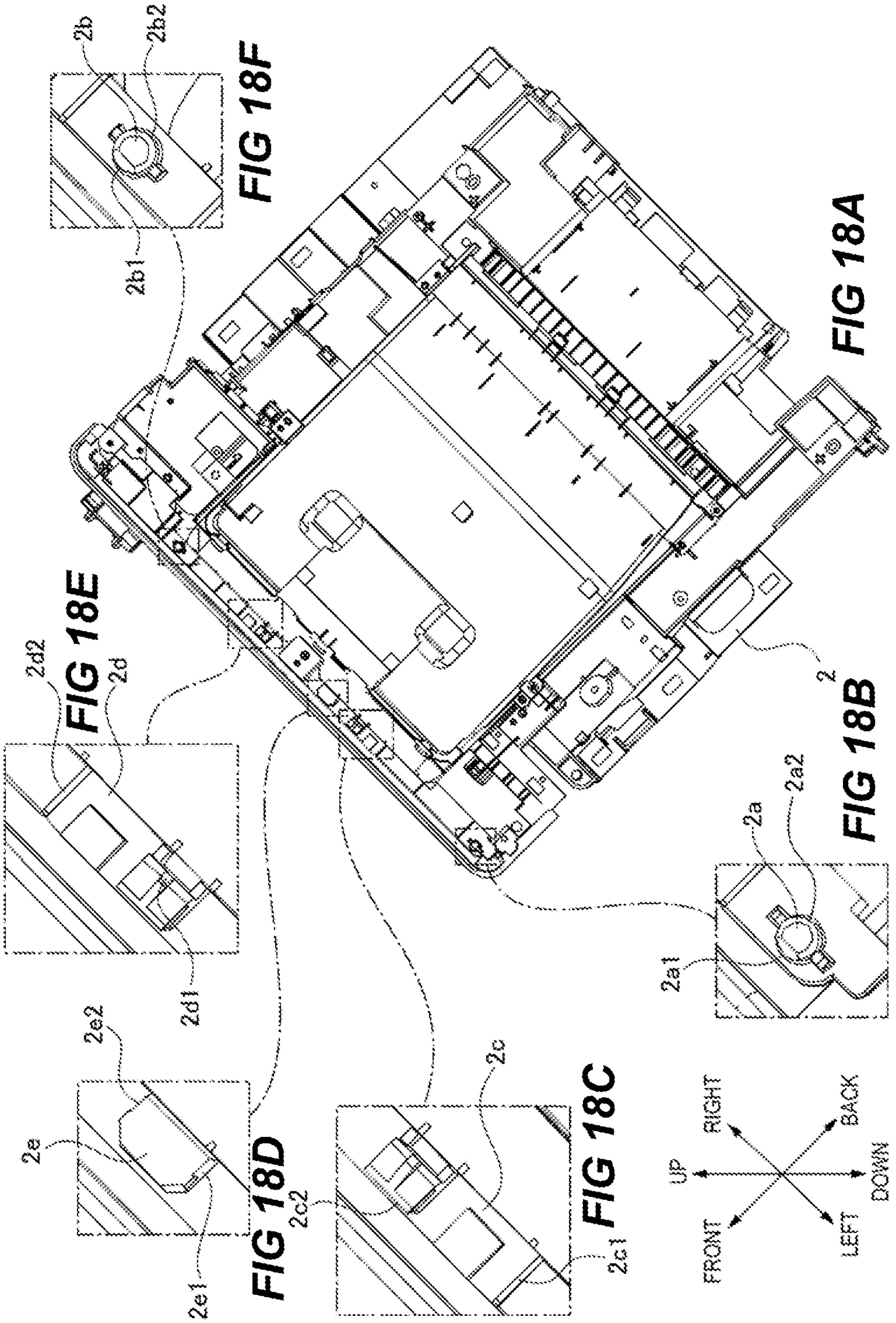
FIGS. 18A to 18F are perspective views of the upper cover of the third embodiment.

FIG. 16 is a perspective view of an image forming apparatus according to a third embodiment. FIG. 17 is a perspective view of an upper cover of the third embodiment. FIGS. 18A to 18F are perspective views of the upper cover of the third embodiment, illustrating a plurality of engaging portions included in the upper cover.

The image forming apparatus 1 according to the third embodiment includes the frame 8 (FIG. 5), the front cover 7 fixed to the front surface of the frame 8, and the upper cover 22 disposed on the upper surface of the frame 8 and having a plurality of engaging portions that is engaged with the front cover 7 fixed to the front surface of the frame 8. The plurality of engaging portions included in the upper cover 22 is similar to the plurality of engaging portions (first engaging portions 2*a* and 2*b*, second engaging portions 2*c* and 2*d*, and third engaging portion 2*e*) included in the upper cover 2 of the first embodiment described above, and thus, are denoted by the same reference numerals, and description is omitted.

In the image forming apparatus 1, a feeding portion (not illustrated), an image forming portion (not illustrated), and a discharge portion (not illustrated) are accommodated, and its periphery is surrounded by the upper cover 22, the front cover 7 including the multi-cover 3, the right cover 5, and the left cover 6.

Further, in the image forming apparatus 1 according to the third embodiment, an image reading unit 28 that reads image information is disposed in the upper portion of the upper cover 22.

Therefore, in the image forming operation in the image forming apparatus 1 according to the third embodiment, first, an image read by the image reading unit 28 or an image from an external device such as a personal computer connected to the image forming apparatus 1 is input to the apparatus. Next, a sheet is fed one by one by a feeding portion (not illustrated) from the sheet cassette 4 disposed in a lower portion of the image forming apparatus 1. The input image is formed on the sheet by an image forming portion (not illustrated) provided inside the apparatus main body. The sheet on which the image is formed is discharged into a discharge space provided between the image reading unit 28 and the image forming apparatus main body by a discharge portion (not illustrated), and is stacked on a discharge tray provided in the lower portion of the image reading unit 28 and the upper portion of the image forming apparatus main body.

Other configurations of the image forming apparatus 1 according to the third embodiment are similar to those of the image forming apparatus of the first embodiment described above, and thus, description is omitted here.

As described above, also in the present embodiment, the front cover 7 regulates the position of the upper cover 22 in the front-back direction, the up-down direction, and the right-left direction. Therefore, the upper cover 22 can be accurately attached by the front cover 7, the accuracy of the matching between the front cover 7 and the upper cover 2 is enhanced, and the aesthetic appearance of the appearance can be improved. Further, since the image reading unit 28 is disposed in the upper portion of the upper cover 22, the image reading unit 28 can be accurately attached to the image forming apparatus 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-183021, filed Nov. 10, 2021, which is hereby incorporated by reference herein in its entirety.

What is claimed is:

1. An image forming apparatus comprising:

a frame;

a front cover that is fixed to a front surface of the frame; and an upper cover that is disposed on an upper surface of the frame and includes a plurality of engaging portions that is engaged with the front cover fixed to a front surface of the frame, wherein when a side on which the front cover is fixed is defined as a front side and an opposite side is defined as a back side, when the image forming apparatus is viewed from the front side, one side in a width direction orthogonal to a front-back direction is defined as a right side and the other side is defined as a left side, and when an upward direction in a vertical direction orthogonal to the front-back direction and a right-left direction is defined as an upper side and a downward direction is defined as a lower side, the front cover includes:

a front-back regulating portion that is engaged with a first engaging portion included in the upper cover and abuts on a front side and a back side of the first engaging portion in the front-back direction to regulate a position of the upper cover in the front-back direction;

an up-down regulating portion that is engaged with a second engaging portion included in the upper cover and abuts on an upper side and a lower side of the second engaging portion in an up-down direction to regulate a position of the upper cover in the up-down direction; and a right-left regulating portion that is engaged with a third engaging portion included in the upper cover and abuts on a left side and a right side of the third engaging portion in the right-left direction to regulate a position of the upper cover in the right-left direction, and the first engaging portion, the second engaging portion, and the third engaging portion included in the upper cover are respectively engaged with the front-back regulating portion, the up-down regulating portion, and the right-left regulating portion of the front cover fixed to the front side of the frame to regulate the position of the upper cover in the front-back direction, the up-down direction, and the right-left direction.

2. The image forming apparatus according to claim 1, wherein the front-back regulating portion, the up-down regulating portion, and the right-left regulating portion are provided side by side in the right-left direction at an upper side end portion of the front cover, and the first engaging portion, the second engaging portion, and the third engaging portion are provided side by side in the right-left direction at the front side end portion of the upper cover to correspond to the front-back regulating portion, the up-down regulating portion, and the right-left regulating portion, respectively.

3. The image forming apparatus according to claim 1, wherein the right-left regulating portion is provided at a center in the right-left direction, and the up-down regulating portion and the front-back regulating portion are provided sequentially on one side and the other side in the right-left direction of the right-left regulating portion, and two of the first engaging portions, two of the second engaging portions, and one of the third engaging portion are provided at positions corresponding to two of the front-back regulating portions, two of the up-down regulating portions, and one of the right-left regulating portion provided in the front cover.

4. The image forming apparatus according to claim 3, wherein in the front cover, two of the front-back regulating portions, two of the up-down regulating portions, and one of the right-left regulating portion are provided in order of the front-back regulating portion, the up-down regulating portion, the right-left regulating portion, the up-down regulating portion, and the front-back regulating portion from one side in the right-left direction, and in the upper cover, two of the first engaging portions, two of the second engaging portions, and one of the third engaging portion are provided in order of the first engaging portion, the second engaging portion, the third engaging portion, the second engaging portion, and the first engaging portion from one side in the right-left direction.

5. The image forming apparatus according to claim 3, wherein in the front cover, two of the front-back regulating portions, two of the up-down regulating portions, and one of the right-left regulating portion are provided in order of the up-down regulating portion, the front-back regulating portion, the right-left regulating portion, the front-back regulating portion, and the up-down regulating portion from one side in the right-left direction, and in the upper cover, two of the first engaging portions, two of the second engaging portions, and one of the third engaging portion are provided in order of the second engaging portion, the first engaging portion, the third engaging portion, and the first engaging portion, and the second engaging portion from one side in the right-left direction.

6. The image forming apparatus according to claim 1, wherein the front cover includes an engaging portion engaged with a positioning portion of the frame, and a fastening portion fastened to the frame with a screw.

7. The image forming apparatus according to claim 1, wherein in the image forming apparatus, an image reading unit that reads image information is disposed in an upper portion of the upper cover.

8. The image forming apparatus according to claim 1, wherein the front cover is provided in a manner that a multi-cover can be opened and closed.

9. The image forming apparatus according to claim 1, further comprising a side surface cover disposed on a left side surface or a right side surface of the frame and including a plurality of engaging portions engaged with the front cover fixed to a front surface of the frame, wherein the front cover includes:

a front-back regulating portion that is engaged with a first engaging portion included in the side surface cover and abuts on a front side and a back side of the first engaging portion in the front-back direction to regulate a position of the side surface cover in the front-back direction;

an up-down regulating portion that is engaged with a second engaging portion included in the side surface cover and abuts on an upper side and a lower side of the second engaging portion in the up-down direction to regulate a position of the side surface cover in the up-down direction; and a right-left regulating portion that is engaged with a third engaging portion included in the side surface cover and abuts on a left side and a right side of the third engaging portion in a right-left direction to regulate a position of the side surface cover in the right-left direction, and the first engaging portion, the second engaging portion, and the third engaging portion included in the side surface cover are respectively engaged with the front-back regulating portion, the up-down regulating portion, and the right-left regulating portion of the front cover fixed to the front side of the frame to regulate the position of the side surface cover in the front-back direction, the up-down direction, and the right-left direction.

10. The image forming apparatus according to claim 9, wherein the front-back regulating portion, the up-down regulating portion, and the right-left regulating portion are provided side by side in the up-down direction at a left side or right side end portion of the front cover, and the first engaging portion, the second engaging portion, and the third engaging portion are provided side by side in the up-down direction at the front side end portion of the side surface cover to correspond to the front-back regulating portion, the up-down regulating portion, and the right-left regulating portion, respectively.

11. The image forming apparatus according to claim 9, wherein two of the right-left regulating portions, two of the front-back regulating portions, and one of the up-down regulating portion are provided side by side in the up-down direction at the left side or right side end portion of the front cover, and two of the third engaging portions, two of the first engaging portions, and one of the second engaging portion are provided at positions corresponding to two of the right-left regulating portions, two of the front-back regulating portions, and one of the up-down direction provided in the front cover.

12. The image forming apparatus according to claim 11, wherein in the front cover, two of the right-left regulating portions, two of the front-back regulating portions, and one of the up-down regulating portion are provided in order of the right-left regulating portion, the up-down regulating portion, the front-back regulating portion, the front-back regulating portion, and the right-left regulating portion from the upper side in the up-down direction, and in the side surface cover of the left side surface, two of the third engaging portions, two of the first engaging portions, and one of the second engaging portion are provided in order of the third engaging portion, the second engaging portion, the first engaging portion, the first engaging portion, and the third engaging portion from the upper side in the up-down direction.

13. The image forming apparatus according to claim 11, wherein in the front cover, two of the right-left regulating portions, two of the front-back regulating portions, and one of the up-down regulating portion are provided in order of the right-left regulating portion, the up-down regulating portion, the front-back regulating portion, the right-left regulating portion, and the front-back regulating portion from the upper side in the up-down direction, and in the side surface cover of the right side surface, two of the third engaging portions, two of the first engaging portions, and one of the second engaging portion are provided in order of the third engaging portion, the second engaging portion, the first engaging portion, the third engaging portion, and the first engaging portion from the upper side in the up-down direction.

14. The image forming apparatus according to claim 9, wherein the front cover includes an engaging portion engaged with a positioning portion of the frame, and a fastening portion fastened to the frame with a screw.

15. The image forming apparatus according to claim 9, wherein in the image forming apparatus, an image reading unit that reads image information is disposed in an upper portion of the upper cover.

16. The image forming apparatus according to claim 9, wherein the front cover is provided in a manner that a multi-cover can be opened and closed.

* * * * *